United States Patent
Kim et al.

(10) Patent No.: US 11,412,577 B2
(45) Date of Patent: Aug. 9, 2022

(54) ELECTRONIC APPARATUS AND CONTROL METHOD THEREOF

(71) Applicant: SAMSUNG ELECTRONICS CO., LTD., Suwon-si (KR)

(72) Inventors: Jinho Kim, Suwon-si (KR); Geunyoung Yu, Suwon-si (KR); Sukun Yoon, Suwon-si (KR); Minju Lee, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 187 days.

(21) Appl. No.: 16/829,171

(22) Filed: Mar. 25, 2020

(65) Prior Publication Data

US 2020/0314958 A1 Oct. 1, 2020

(30) Foreign Application Priority Data

Apr. 1, 2019 (KR) ........................ 10-2019-0037873

(51) Int. Cl.
*H04W 88/06* (2009.01)
*H04W 76/11* (2018.01)
(Continued)

(52) U.S. Cl.
CPC ......... *H04W 88/06* (2013.01); *H04L 61/2514* (2013.01); *H04L 61/6022* (2013.01);
(Continued)

(58) Field of Classification Search
CPC ............... H04W 88/06; H04L 61/2514; H04L 61/6022; H04L 61/103
See application file for complete search history.

(56) References Cited

U.S. PATENT DOCUMENTS

2005/0271032 A1  12/2005  Yun et al.
2008/0232299 A1   9/2008  Mosig
(Continued)

FOREIGN PATENT DOCUMENTS

EP    2 706 726    9/2013
EP    2 871 788   11/2014
(Continued)

OTHER PUBLICATIONS

European Office Action dated Apr. 21, 2021 in corresponding European Application No. 20164954.8.
(Continued)

*Primary Examiner* — Mohammad S Anwar
(74) *Attorney, Agent, or Firm* — Nixon & Vanderhye, P.C.

(57) ABSTRACT

An electronic apparatus includes: a first communication circuit configured to perform wireless communication in a first mode; a second communication circuit configured to perform wireless communication with an access point in a second mode; and a processor configured to control the electronic apparatus to: obtain first identification information for a first mode-based wireless communication of an external apparatus through the first communication circuit, obtain address information for a second mode-based wireless communication of the external apparatus through the first communication circuit, obtain second identification information for the second mode-based wireless communication of the external apparatus through the second communication circuit using the obtained address, identify whether communication connection with the external apparatus is established through the first communication circuit or the second communication circuit based on the obtained first identification information, address information and second identification information, and perform an operation (Continued)

based on whether the communication connection with the external apparatus is established.

17 Claims, 24 Drawing Sheets

(51) Int. Cl.
    *H04L 61/2514*     (2022.01)
    *H04L 101/622*     (2022.01)
    *H04L 101/636*     (2022.01)
    *H04W 8/00*     (2009.01)
    *H04W 8/26*     (2009.01)
    *H04W 48/16*     (2009.01)
    *H04W 84/12*     (2009.01)

(52) U.S. Cl.
    CPC ......... *H04L 61/6036* (2013.01); *H04W 8/005* (2013.01); *H04W 8/26* (2013.01); *H04W 48/16* (2013.01); *H04W 76/11* (2018.02); *H04W 84/12* (2013.01)

(56) References Cited

U.S. PATENT DOCUMENTS

| | | | |
|---|---|---|---|
| 2010/0318633 A1* | 12/2010 | Abzarian | H04L 29/12028 709/219 |
| 2013/0247121 A1 | 9/2013 | Yuan | |
| 2013/0281110 A1* | 10/2013 | Zelinka | H04W 4/02 455/456.1 |
| 2014/0105198 A1 | 4/2014 | Banerjea et al. | |
| 2016/0219329 A1* | 7/2016 | Jee | H04L 65/1073 |
| 2016/0359802 A1* | 12/2016 | Shpak | H04L 61/2015 |
| 2017/0094449 A1 | 3/2017 | Murakawa | |

FOREIGN PATENT DOCUMENTS

| | | |
|---|---|---|
| EP | 3 373 528 | 12/2016 |
| KR | 10-1899744 | 9/2018 |
| WO | 02/073430 | 9/2002 |

OTHER PUBLICATIONS

International Search Report and Written Opinion dated Jul. 21, 2020 in counterpart International Patent Application No. PCT/KR2020/003859.

Extended Search Report and Written Opinion dated Jun. 29, 2020 in counterpart European Patent Application No. 20164954.8.

Examination Report dated Apr. 28, 2022 in corresponding Indian Patent Application No. 202117047392 and English-language translation.

* cited by examiner

| Mobile ID | BLE MAC address | WiFi MAC Detected | Registered WiFi MAC address | Last Connected IP address |
|---|---|---|---|---|
| 1 | gg:hh:ii:jj:kk:ll | 0 | - | 192.168.0.10 |
| 2 | gg:hh:ii:jj:kk:ll | 1 | aa:bb:cc:dd:ee:ff | 192.168.0.20 |
| 3 | gg:hh:ii:jj:kk:ll | 1 | 11:22:33:44:55:66 | 192.168.0.30 |

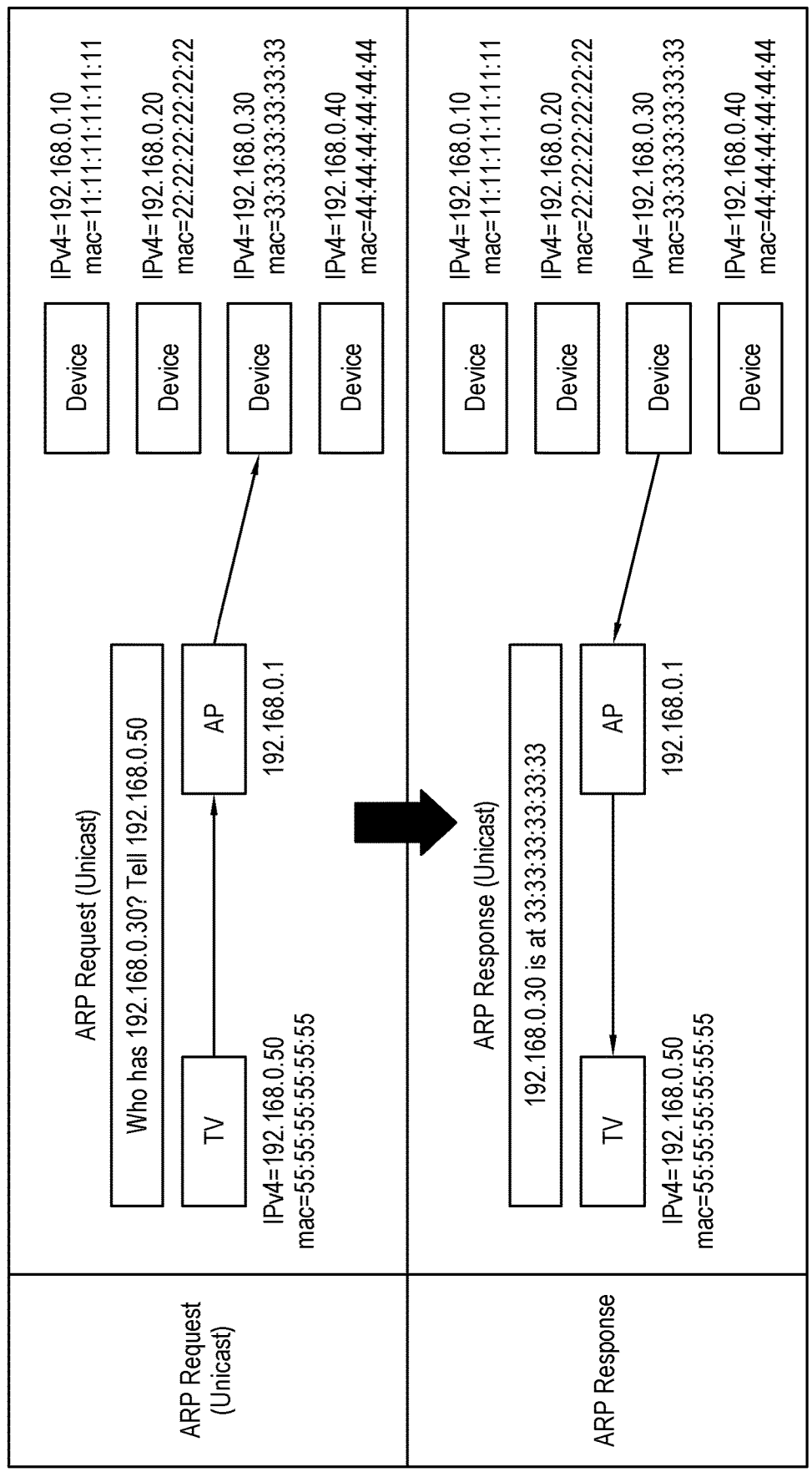

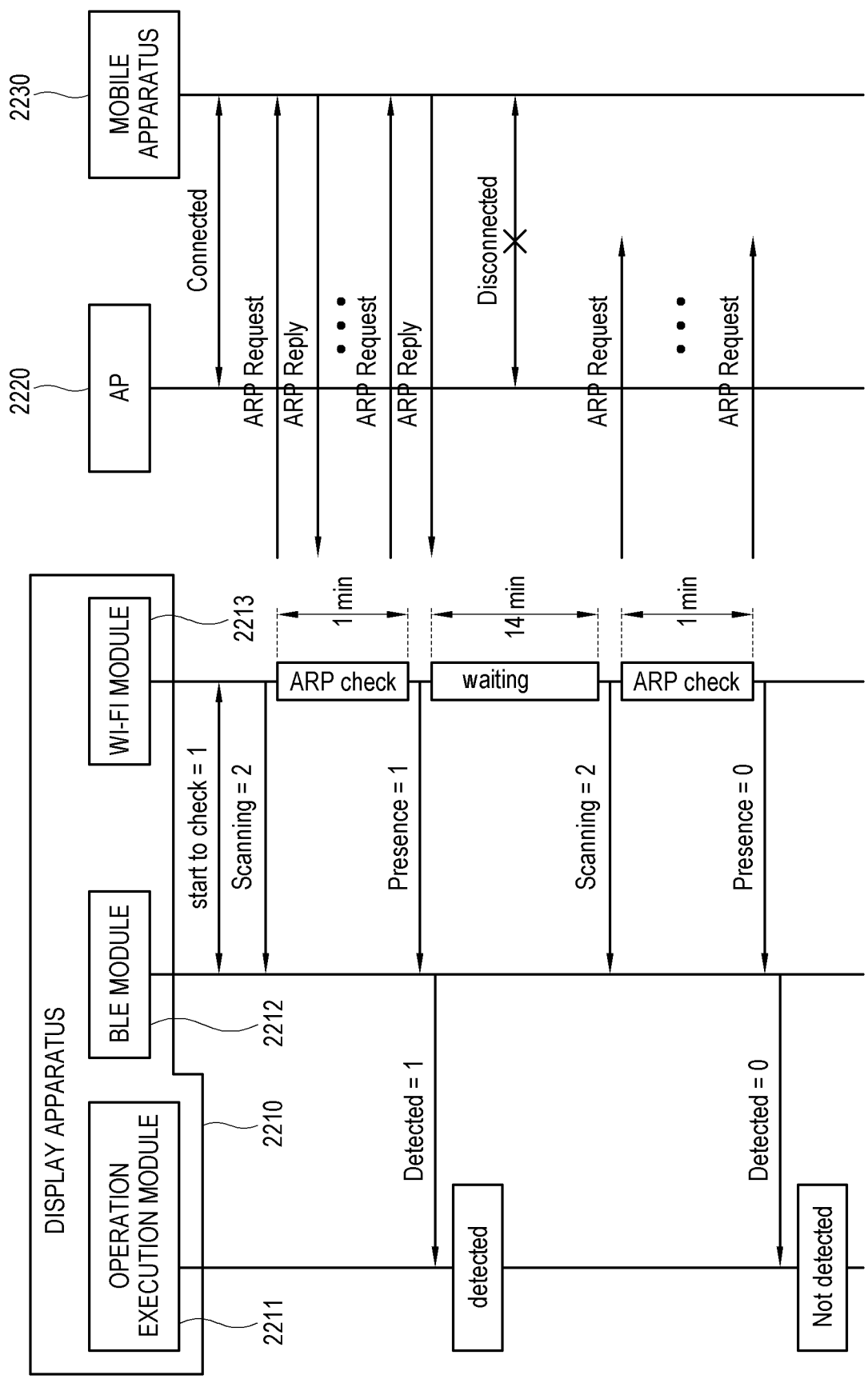

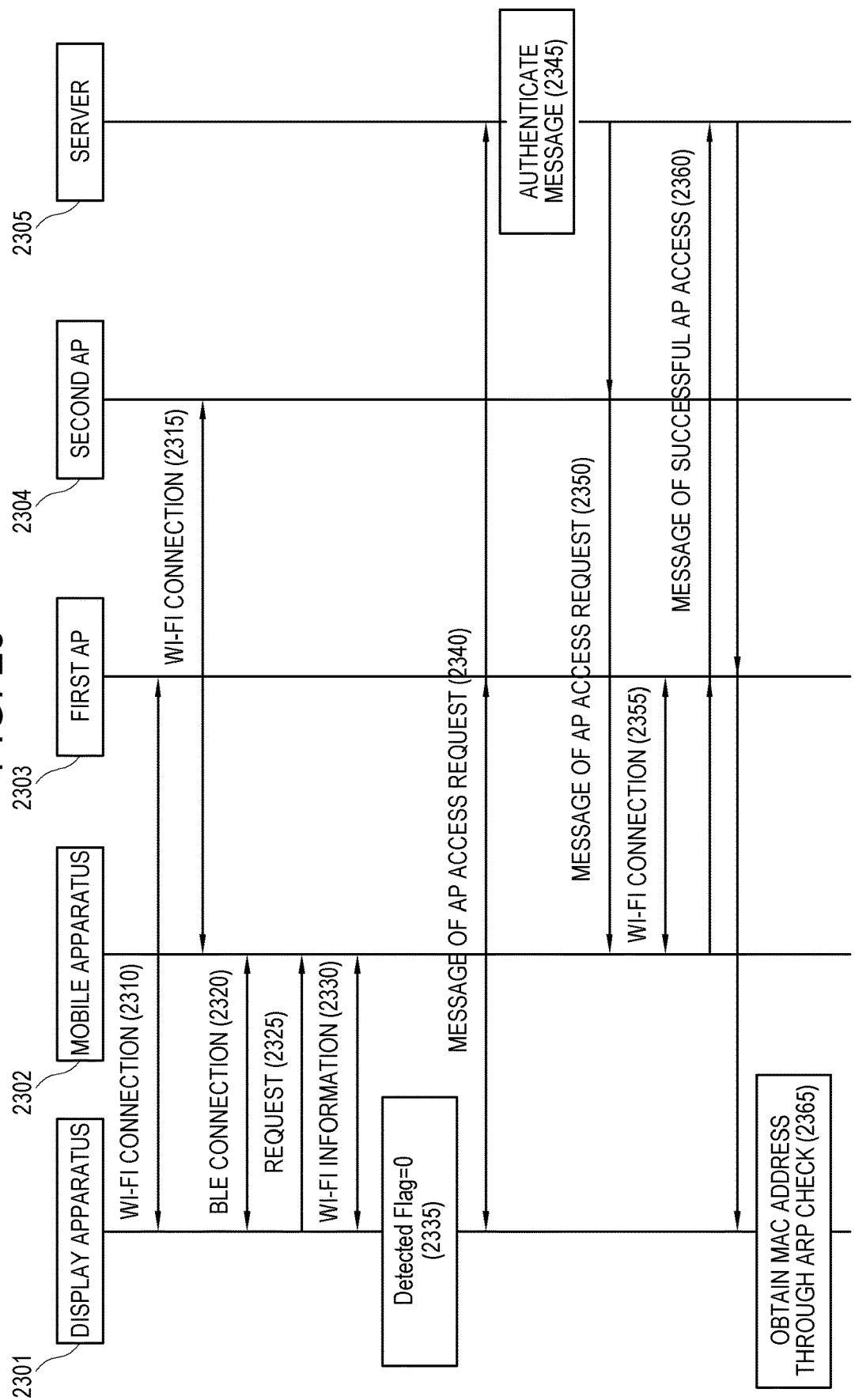

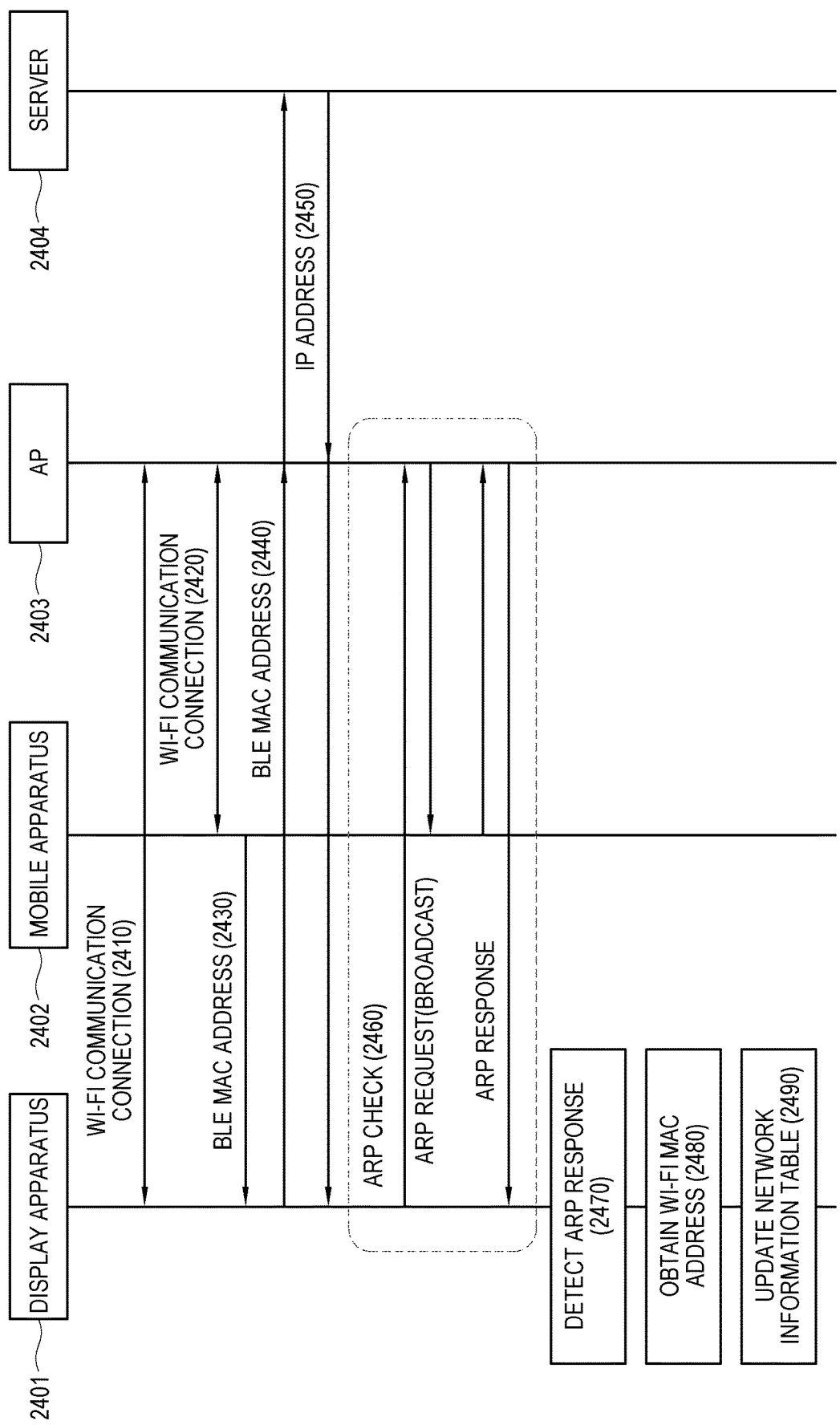

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2019-0037873, filed on Apr. 1, 2019 in the Korean Intellectual Property Office, the disclosure of which is incorporated by reference herein in its entirety.

BACKGROUND

Field

The disclosure relates to an electronic apparatus capable of wirelessly communicating with an external apparatus such as a mobile apparatus or the like and a control method thereof, and for example, to an electronic apparatus, which performs communication connection with an external apparatus through various wireless communication protocols, and a control method thereof.

Description of Related Art

To compute and process predetermined information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image data; an audio apparatus for audio process; home appliances for miscellaneous household chores; etc. The image processing apparatus may be embodied by a display apparatus that displays an image based on processed image data on its own display panel. Further, the electronic apparatus is classified into a stationary type of being installed at one place and a mobile type of being carriable by a user according to use modes.

A display apparatus used at general home as a television (TV) has various operation modes such as a normal mode for reproducing a broadcast program to display a broadcast screen, a standby mode for operating at only minimum standby power while turning off the screen without reproducing the broadcast program, a so-called ambient mode for reproducing no broadcast programs but displaying a previously prepared standby image on the screen, etc. The display apparatus may selectively operate in one among various operation modes according to previously designated conditions.

As an example of such conditions, the display apparatus may identify whether a user is near the installation place of the display apparatus. Because the standby image displayed on the screen in the ambient mode is prepared for being viewed by a user, it may be less effective when the user is not close to the display apparatus. That is, in a case where the display apparatus is not displaying a broadcast image, the display apparatus operates in the ambient mode when a user is near, and operates in the standby mode when a user is not near.

To identify whether a user is close to the display apparatus, the display apparatus may identify whether preset short-range wireless communication with a mobile apparatus carried by the user is possible or not. To enable the display apparatus to wirelessly communicate with the mobile apparatus, these two electronic apparatuses have to support one or more wireless communication protocols in common, and the display apparatus needs to have the Internet protocol (IP) address and physical network address of the mobile apparatus based on the wireless communication protocol. Thus, the display apparatus operates in the ambient mode when the short-range wireless communication with the mobile apparatus of the user is possible, and switches over to the standby mode when the short-range wireless communication with the mobile apparatus is not possible.

SUMMARY

Embodiments of the disclosure provide an example electronic apparatus including: a first communication circuit configured to perform wireless communication in a first mode; a second communication circuit configured to perform wireless communication with an access point in a second mode; and a processor configured to control the electronic apparatus to: obtain first identification information for a first mode-based wireless communication of an external apparatus through the first communication circuit, obtain address information for a second mode-based wireless communication of the external apparatus through the first communication circuit, obtain second identification information for the second mode-based wireless communication of the external apparatus through the second communication circuit using the obtained address, identify whether communication connection with the external apparatus is established through the first communication circuit or the second communication circuit based on the obtained first identification information, address information and second identification information, and perform an operation based on whether the communication connection with the external apparatus is established.

The first mode-based wireless communication may include Bluetooth communication complying with institute of electrical and electronic engineers (IEEE) 802.15 standards, and the second mode-based wireless communication may include a wireless local area network (WLAN) communication complying with IEEE 802.11 standards.

The first identification information for the first mode-based wireless communication may include medium access control (MAC) address information for Bluetooth communication, and the second identification information for the second mode-based wireless communication may include MAC address information for WLAN communication.

The address information for the second mode-based wireless communication may include Internet protocol (IP) address.

The processor may be configured to control the electronic apparatus to: transmit in a broadcast mode a request for the second identification information based on the IP address to a plurality of external apparatuses connected to the access point, and receive a response including the second identification information from the external apparatus corresponding to the IP address among the plurality of external apparatuses through the second communication circuit.

The processor may be configured to control the electronic apparatus to: store a record that the response including the second identification information has not been received, and periodically transmit the request based on the stored record.

The processor may be configured to control the electronic apparatus to: transmit the request corresponding to the access point connected through the second communication circuit based on the IP address, is the IP address being identified as equal to an access point to which the external apparatus is connected, and update the records of the external apparatus.

The processor may be configured to control the electronic apparatus to: obtain identification information of an access point to which the external apparatus is connected from the external apparatus through the first communication circuit, and identify whether the access point is equal to the access point connected through the second communication circuit based on the obtained identification information.

The processor may be configured to control the electronic apparatus to: transmit in a unicast mode a request for the second identification information based on the IP address to the external apparatus through the second communication circuit, based on the second identification information obtained through the first communication circuit, and identify that the external apparatus is within a specified proximity to the electronic apparatus based on the response received from the external apparatus.

The processor may be configured to identify whether the IP address corresponding to the obtained second identification information has been changed, and control the electronic apparatus to reobtain the changed IP address by scanning the IP addresses within an address range of a subnet network, based on the change in the IP address.

The processor may be configured to control the electronic apparatus to: display an image based on identification of communication connection with the external apparatus, and stop displaying the image based on identification of communication disconnection from the external apparatus while displaying the image.

The first mode may include one-to-one communication without using the access point, the first mode having a shorter communication range than the second mode.

The processor may control the electronic apparatus to perform communication connection using the second communication circuit based on disconnection of communication connection using the first communication circuit.

The processor may control the electronic apparatus to transmit a guide message for accessing the access point to the external apparatus through the first communication circuit, based on not obtaining the second identification information even though communication connection using the first communication circuit is possible.

Based on not obtaining the second identification information while being connected to a certain access point among a plurality of access points through the second communication circuit, the processor may control the electronic apparatus to obtain the second identification information by accessing another access point among the plurality of access points.

The processor may control the electronic apparatus to obtain the IP address from the external apparatus through the first communication circuit.

The processor may control the electronic apparatus to transmit the first identification information to a server through the second communication circuit, and receive the IP address corresponding to the first identification information from the server through the second communication circuit.

According to another example embodiment of the disclosure of the present disclosure, a method of controlling an electronic apparatus is provided, the method including: obtaining first identification information for first mode-based wireless communication of an external apparatus through a first communication circuit configured to perform wireless communication in a first mode; obtaining address information for second mode-based wireless communication of the external apparatus through the first communication circuit; obtaining second identification information for second mode-based wireless communication of the external apparatus through the second communication circuit using the obtained address through a second communication circuit configured to perform wireless communication with an access point in a second mode; identifying whether communication connection with the external apparatus is established through the first communication circuit or the second communication circuit, based on the obtained first identification information, address information and second identification information; and performing an operation based on whether the communication connection with the external apparatus is established.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 5 is a diagram illustrating an example network information table tabulated by a display apparatus at initial settings according to an example embodiment of the disclosure;

FIG. 21 is a diagram illustrating an example ARP checking principle in a unicast mode according to an example embodiment of the disclosure;

FIG. 22 is a signal flow diagram illustrating an example in which a display apparatus periodically detects a mobile apparatus within a local network during an ARP Keepalive operation according to an example embodiment of the disclosure;

FIG. 23 is a signal flow diagram illustrating an example in which a display apparatus instructs a mobile apparatus to access an AP to which the display apparatus is connected according to an example embodiment; and FIG. 24 is a signal flow diagram illustrating an example signal flow between apparatuses when a display apparatus obtains a Wi-Fi MAC address through BLE communication according to an example embodiment of the disclosure.

DETAILED DESCRIPTION

Various example embodiments will be described in greater detail below with reference to the accompanying drawings. Further, the example embodiments described with reference to the accompanying drawings are not exclusive to each other unless otherwise mentioned, and a plurality of embodiments may be selectively combined within one apparatus. The combination of these various embodiments may be discretionally selected and applied to realize various aspects of the disclosure.

In the disclosure, an ordinal number used in terms such as a first element, a second element, etc. is employed for describing variety of elements, and the terms are used for distinguishing between one element and another element. Therefore, the meanings of the elements are not limited by the terms, and the terms are also used simply for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
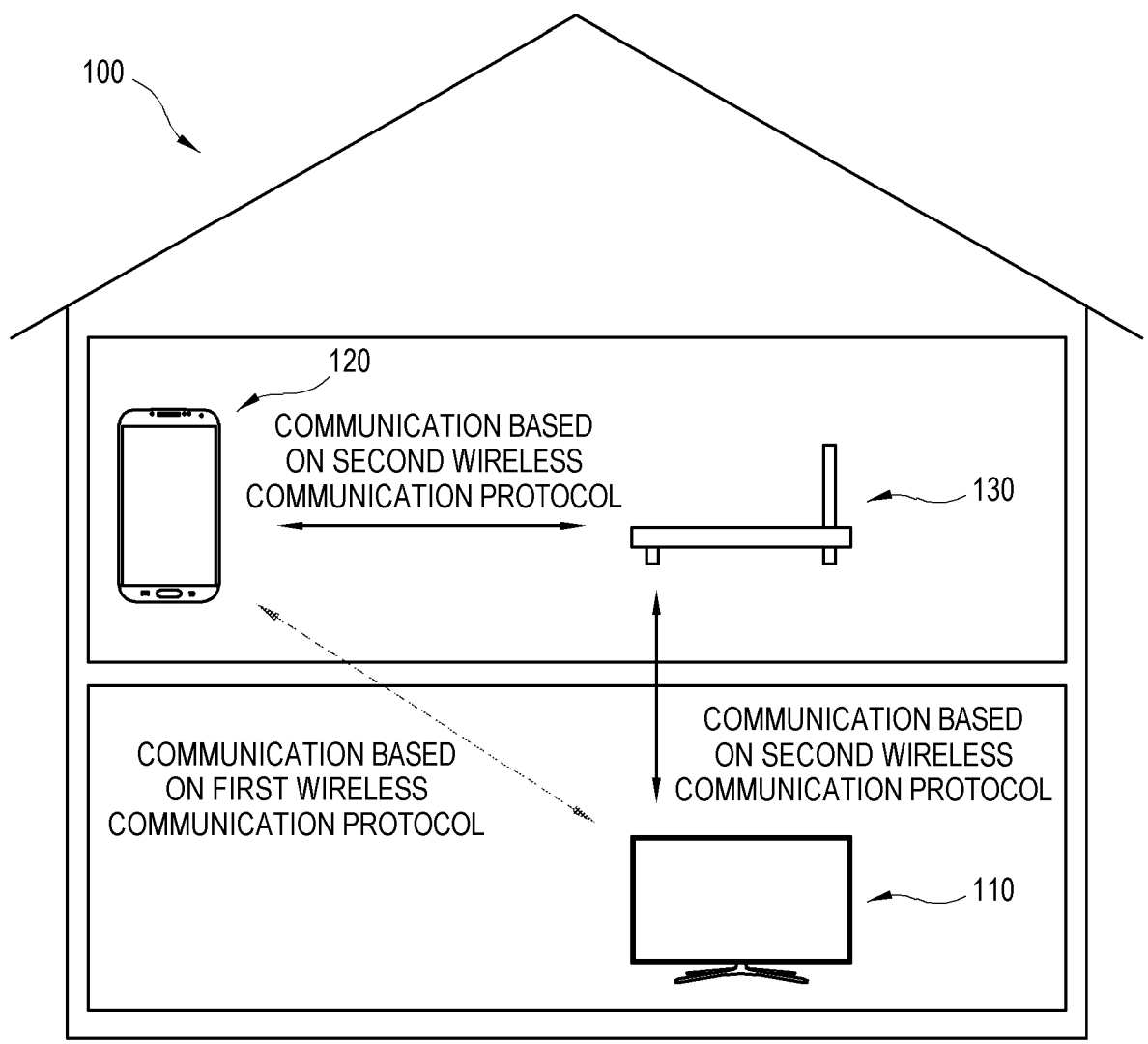
FIG. 1 is a diagram illustrating an example environment in which a display apparatus wirelessly communicates with a mobile apparatus according to an example embodiment of the disclosure.

FIG. 1 is a diagram illustrating an example environment in which a display apparatus wirelessly communicates with a mobile apparatus according to an example embodiment of the disclosure;

As shown in FIG. 1, a plurality of electronic apparatuses 110 and 120 are used under a predetermined environment such as home 100 or the like. According to an example embodiment, a certain electronic apparatus 110 may, for example, and without limitation, be achieved by a television (TV) or the like display apparatus 110 stationarily installed at one place, while another electronic apparatus 120 may, for example, and without limitation, be achieved by a mobile apparatus 120 carriable and movable by a user. However, the electronic apparatuses 110 and 120 may be achieved by any type of apparatuses between which wireless communication is possible, and there are no limits to the title and kind of apparatuses. For example, when one of the plurality of apparatuses 110 and 120 is called an electronic apparatus 110, another one may be called an external apparatus 120 to be distinguished from the electronic apparatus 110.

The display apparatus 110 and the mobile apparatus 120 may support a plurality of wireless communication protocols in common, and thus wirelessly communicate with each other based on the wireless communication protocols. For example, the display apparatus 110 may perform direct 1:1 communication with the mobile apparatus 120 based on a first wireless communication protocol. Further, the display apparatus 110 may perform communication with the mobile apparatus 120 through an access point (AP) 130 based on a second wireless communication protocol. The AP 130 may be connected to a wide area network in which a server (not shown) is present, so that the display apparatus 110 can communicate with the server through the AP 130.

According to an example embodiment, the first wireless communication protocol may correspond, for example, to Bluetooth low energy (BLE), and the second wireless communication protocol may correspond, for example, to Wi-Fi. However, this is merely an example, and the first wireless communication protocol or the second wireless communication protocol may be achieved by various kinds of communication protocols.

When the display apparatus 110 is achieved by the TV, the display apparatus 110 may operate, for example, in one of a normal mode in which a broadcast image is displayed and a standby mode in which a broadcast image is not displayed. Further, the standby mode may be classified into a first standby mode in which a screen is turned off and minimum standby power is used, and a second standby mode in which a standby image suited to a predetermined purpose such as advertisement, program guide, etc. is displayed. The second standby mode, in which a standby image is displayed while a screen is turned on, may be useful when a user is in a house 100, but unnecessary when a user is not in the house 100.

The display apparatus 110 may switch over to the second standby mode when BLE-based communication with the mobile apparatus 120 occurs during the first standby mode. For reference, a typical BLE-based communication range may, for example, be in a range of about 10 m, and signal interference may occur in the BLE-based communication due to a wall or the like structure. For example, a user may be 10 meters away from the display apparatus 110 like a case where the display apparatus 110 is installed in a living room on the first floor and a user is on the second floor. In this case, the BLE-based communication between the display apparatus 110 and the mobile apparatus 120 may be disconnected even though a user is in the house 100, and therefore the display apparatus 110 may not maintain the second standby mode.

The display apparatus 110 according to an example embodiment may maintain the second standby mode when one of the BLE-based wireless communication and the Wi-Fi-based wireless communication with the mobile apparatus 120 is possible. When the BLE-based wireless communication is disconnected while the display apparatus 110 performs the BLE-based wireless communication with the mobile apparatus 120 and operates in the second standby mode, the display apparatus 110 may try performing the Wi-Fi-based wireless communication with the mobile apparatus 120. When the wireless communication based on at least one of BLE or Wi-Fi is possible, the display apparatus 110 may maintain the second standby mode. On the other hand, when the wireless communication is not possible or achievable by any of BLE and Wi-Fi, the display apparatus 110 may not maintain the second standby mode. This will be described in greater detail below.

Figure 2:
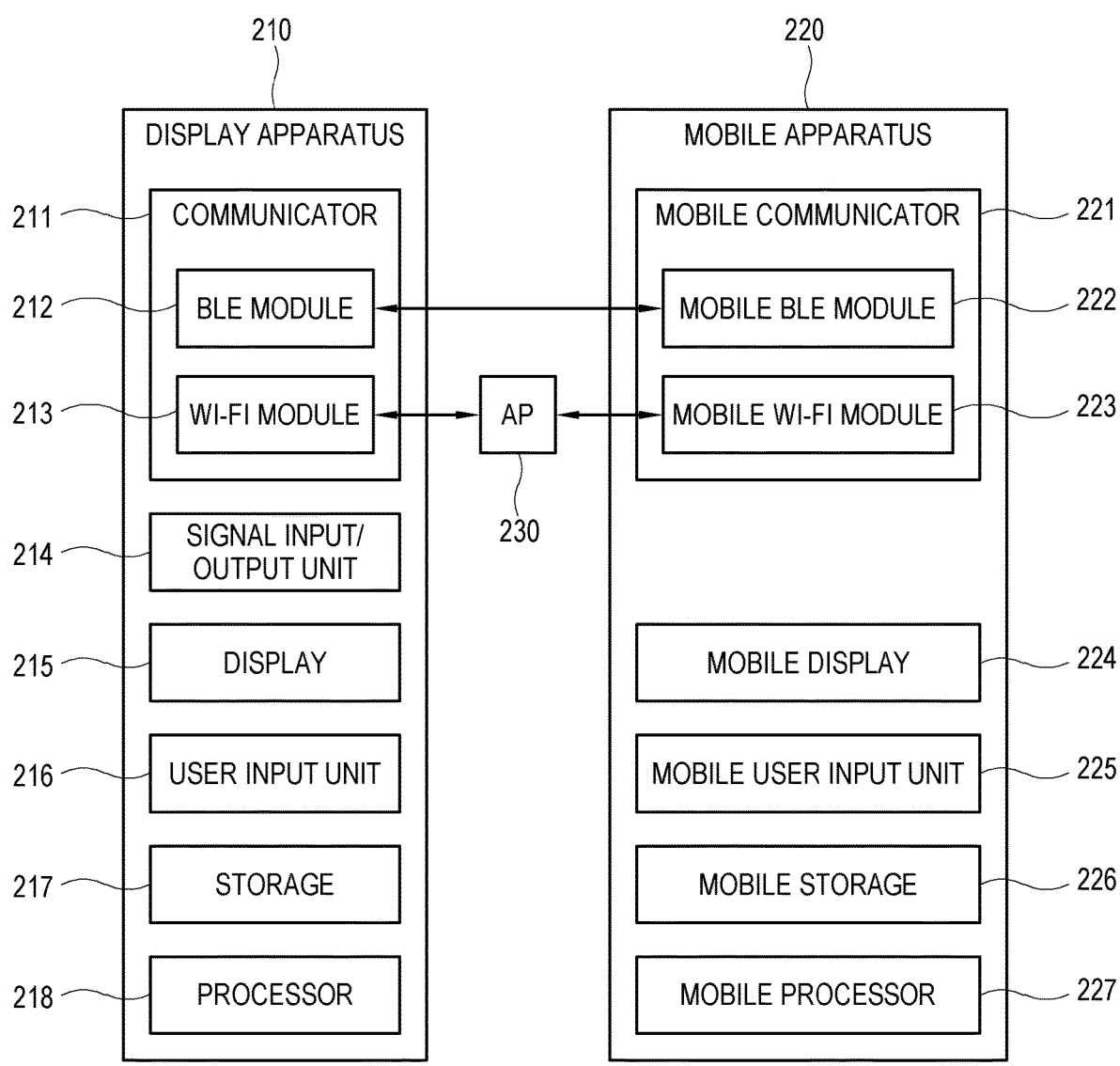
FIG. 2 is a block diagram illustrating an example display apparatus and an example mobile apparatus according to an example embodiment of the disclosure.

FIG. 2 is a block diagram illustrating an example display apparatus and an example mobile apparatus according to an example embodiment of the disclosure.

As shown in FIG. 2, a display apparatus 210 includes a communicator (e.g., including communication circuitry) 211, a signal input/output unit (e.g., including input/output circuitry) 214, a display 215, a user input unit (e.g., including input circuitry) 216, a storage 217, and a processor (e.g., including processing circuitry) 218. The mobile apparatus 220 includes a mobile communicator (e.g., including mobile communication circuitry) 221, a mobile display 224, a mobile user input unit (e.g., including input circuitry) 225, a mobile storage 226, and a mobile processor (e.g., including processing circuitry) 227.

An example configuration of the display apparatus 210 will be described in greater detail below.

The communicator 211 may include, for example, an interactive communication circuit (communication circuitry) that includes at least one of elements, such as a communication module, a communication chip, etc., each including various communication circuitry corresponding to various wired and wireless communication protocols. According to an example embodiment, the communicator 211 may support a plurality of wireless communication protocols, and includes communication circuits, communication chips or communication modules for performing communication based on the wireless communication protocols. The communicator 211 may include a first communication circuit 212 for performing communication based on a first communication protocol, and a second communication circuit 213 for performing communication based on a second communication protocol. For example, the first communication circuit 212 may include a BLE module 212 for BLE communication, and the second communication circuit 213 may include a Wi-Fi module 213 for Wi-Fi communication.

The BLE module 212 may transmit and receive a signal to and from the mobile BLE module 222 of the mobile apparatus 220 based on BLE communication. Further, the Wi-Fi module 213 may transmit and receive a signal to and from the mobile Wi-Fi module 223 if the mobile apparatus 220 through an AP 230 based on Wi-Fi communication. The BLE module 212 and the Wi-Fi module 213 may have independent physical network addresses, respectively. As the physical network addresses, the BLE module 212 may have a BLE medium access control (MAC) address, and the Wi-Fi module 213 may have a Wi-Fi MAC address. These physical network addresses are invariable characteristic values, and thus used as each identification information of the BLE module 212 and the Wi-Fi module 213.

The signal input/output unit 214 may include various input/output circuitry and is one-to-one or one-to-many connected to an external apparatus such as a set-top box or an optical media player by a cable, thereby receiving or outputting data from and to the corresponding external apparatus. The signal input/output unit 214 may, for example, include a high definition multimedia interface (HDMI) port, a display port, a universal serial bus (USB) port, and the like connectors or ports according to preset transmission standards.

The display 215 may include a display panel capable of displaying an image on a screen. The display panel is provided to have a light receiving structure such as a liquid crystal type, or a self-emissive structure such as an organic light emitting diode (OLED) type. The display 215 may include an additional element according to the structures of the display panel. For example, when the display panel is the liquid crystal type, the display 215 includes a liquid crystal display panel, a backlight unit configured to emit light, and a panel driving substrate configured to drive liquid crystal of the liquid crystal display panel.

The user input unit 216 includes circuitry (e.g., input circuitry) related to various input interfaces provided to be controlled by a user to make an input. The user input unit 216 may be variously configured according to the kinds of display apparatus 210, and may for example include a mechanical or electronic button of the display apparatus 210, a remote controller separated from the display apparatus 210, a touch pad, a touch screen installed in the display 215, etc.

The storage 217 may be accessed by the processor 218, and performs operations such as reading, recording, modifying, deleting, updating, etc. for data under control of the processor 218. The storage 217 may include, for example, a flash memory, a hard disk drive (HDD), a solid state drive (SSD), a read only memory (ROM), and the like nonvolatile memory in which data is retained regardless of whether power is supplied or not; and a buffer, a random access memory (RAM) and the like volatile memory to which processing data is loaded.

The processor 218 may include various processing circuitry including one or more hardware processors achieved, for example, and without limitation, by a central processing unit (CPU), a dedicated processor, a chipset, a buffer, a circuit, etc. which may be mounted on a printed circuit board (PCB). The processor 218 may be designed as a system on chip (SoC). The processor 218 may include modules corresponding to various processes, such as, for example, and without limitation, a demultiplexer, a decoder, a scaler, an audio digital signal processor (DSP), an amplifier, etc. for image processing. Among such modules, some or all of the modules may be achieved by the SoC. For example, a demultiplexer, a decoder, a scaler, and the like module related to an image process may be achieved as an image processing SoC, and an audio DSP may be achieved as a chipset separated from the SoC.

An example configuration of the mobile apparatus 220 will be described in greater detail below.

The mobile communicator 221 may include various mobile communication circuitry and may refer, for example, to an interactive communication circuit including, for example, at least one of elements, each of which may include various communication circuitry, such as a communication module, a communication chip, etc. corresponding to various wired and wireless communication protocols. The mobile communicator 221 may include, for example, a mobile BLE module 222 for performing the BLE-based wireless communication, and a mobile Wi-Fi module 223 for performing the Wi-Fi-based wireless communication.

The mobile display 224 may display an image based on an image signal processed by the mobile processor 227.

The mobile user input unit 225 may include various kinds of input interface-relevant circuits prepared to be controlled by a user to receive a user's input. For example, the mobile user input unit 225 may include a physical button provided in the mobile apparatus 220, a touch screen structure provided in the mobile display 224, etc.

The mobile storage 226 may perform operations such as reading, recording, modifying, deleting, updating, etc. for data by the mobile processor 227. The mobile storage 226 may include, for example, and without limitation, a flash memory, an HDD, an SSD, a buffer, a RAM, and the like nonvolatile and volatile memories.

The mobile processor 227 may include various processing circuitry, including, for example, and without limitation, one or more hardware processors embodied, for example, by a CPU, a dedicated processor, a chipset, a buffer, a circuit, etc. which may be mounted on a PCB, and may also be designed as an SoC. The mobile processor 227 may execute an operating system (OS) and various kinds of applications (App) in the mobile apparatus 220. A certain mobile App may have a function of transmitting network addresses of the mobile apparatus 220, which are needed for wireless communication connection, such as an IP address, a physical network address, etc. from the mobile apparatus 220 to the display apparatus 210. Through such an App, the mobile processor 227 may control the mobile apparatus 220 to transmit information needed for BLE or Wi-Fi communication to the display apparatus 210.

With this configuration, the processor 218 of the display apparatus 210 may operate as follows.

Figure 3:
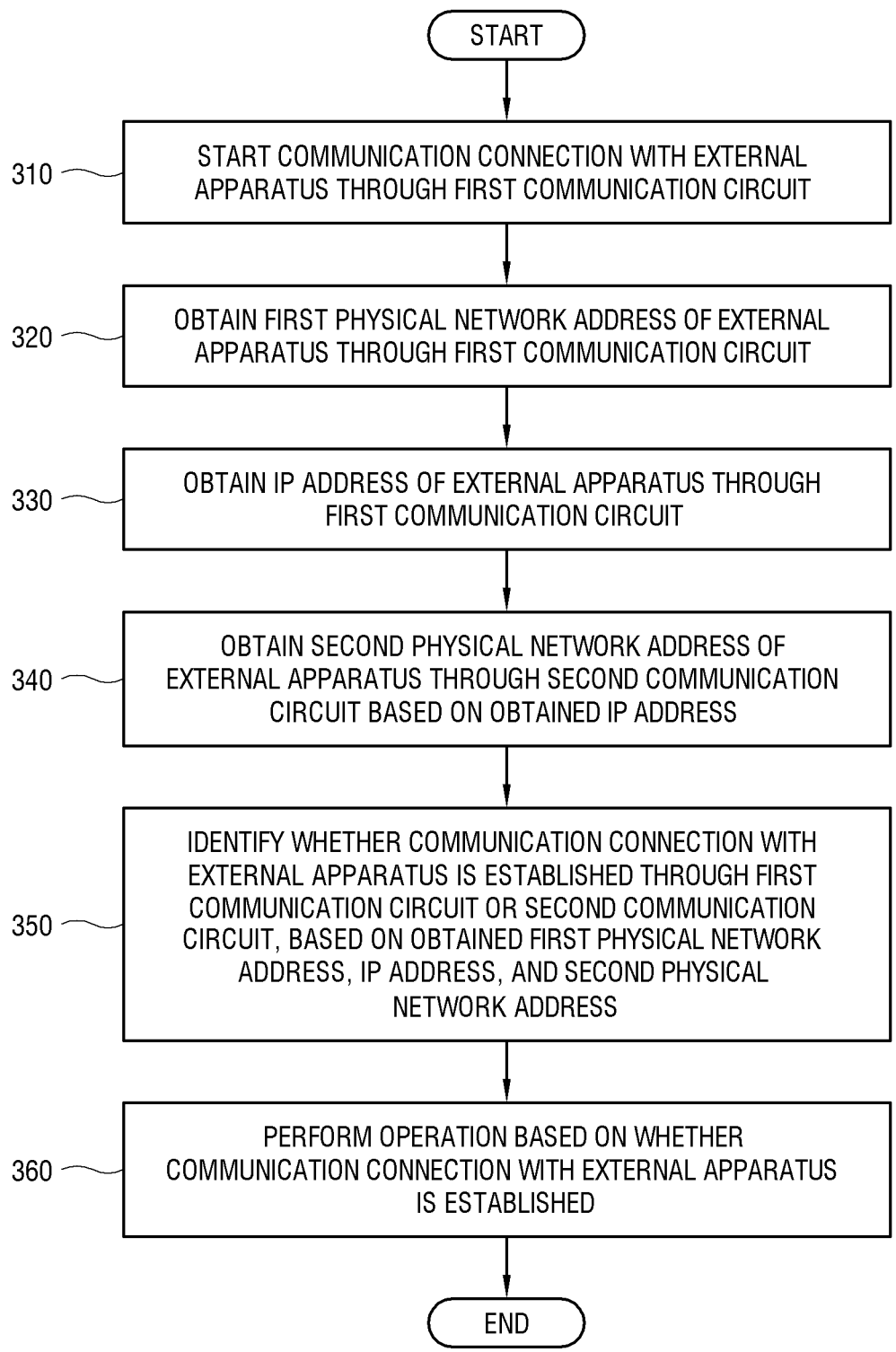
FIG. 3 is a flowchart illustrating an example method of controlling a display apparatus according to an example embodiment of the disclosure.

FIG. 3 is a flowchart illustrating an example method of controlling a display apparatus according to an example embodiment of the disclosure.

As shown in FIG. 3, the following operations may be carried out by the processor of the display apparatus.

At operation 310 the display apparatus starts communication with the external apparatus through the first communication circuit. The communication may start in response to various events such as, for example, and without limitation, a user's input, detection of a discovery signal, etc.

At operation 320 the display apparatus obtains a first physical network address of the external apparatus for the wireless communication of the first mode through the first communication circuit. The first physical network address may refer, for example, to identification information of the communication circuit of the external apparatus, corresponding to the communication protocol (e.g., the first mode) of the first communication circuit.

At operation 330 the display apparatus obtains the IP address of the external apparatus for the wireless communication of the second mode through the first communication circuit.

At operation 340 the display apparatus obtains the second physical network address of the external apparatus for the wireless communication of the second mode through the second communication circuit based on the obtained IP address. The second physical network address may refer, for example, to the identification information of the communication circuit of the external apparatus, corresponding to the communication protocol (e.g., the second mode) of the second communication circuit. Further, the communication protocol of the second communication circuit may correspond to the wireless communication protocol using the AP.

At operation 350 the display apparatus identifies whether the communication connection with the external apparatus is established through the first communication circuit or the second communication circuit, based on the obtained first physical network address, IP address, and second physical network address. The first physical network address is needed for the display apparatus to connect with the external apparatus through the first communication circuit. The IP address and the second physical network address are needed for the display apparatus to connect with the external apparatus through the second communication circuit.

At operation 360 the display apparatus performs operation based on whether the communication connection with the external apparatus is established. For example, the display apparatus operates in a mode of displaying a standby image when the communication connection is possible through at least one of the first communication circuit or the second communication circuit, and operates in a mode of turning off the screen when the communication connection is not possible through any one of the first communication circuit and the second communication circuit.

In this manner, the display apparatus may maintain the communication connection with the external apparatus through at least one of the first communication protocol of the first communication circuit or the second communication protocol of the second communication circuit. Thus, the display apparatus may perform the corresponding operation by maintaining the communication connection of the second communication protocol for a relatively long communication range even though the communication connection of the first communication protocol for a relatively short communication range is disconnected.

Each communication protocol of the first communication circuit and the second communication circuit may be achieved variously. In an example embodiment, the first communication protocol of the first communication circuit may be Bluetooth or BLE which complies with IEEE 802.15 standards, and the second communication protocol of the second communication circuit may be wireless local area network (WLAN) or Wi-Fi which complies with IEEE 802.11 standards. However, the first communication protocol and the second communication protocol are not limited to this example.

Figure 4:
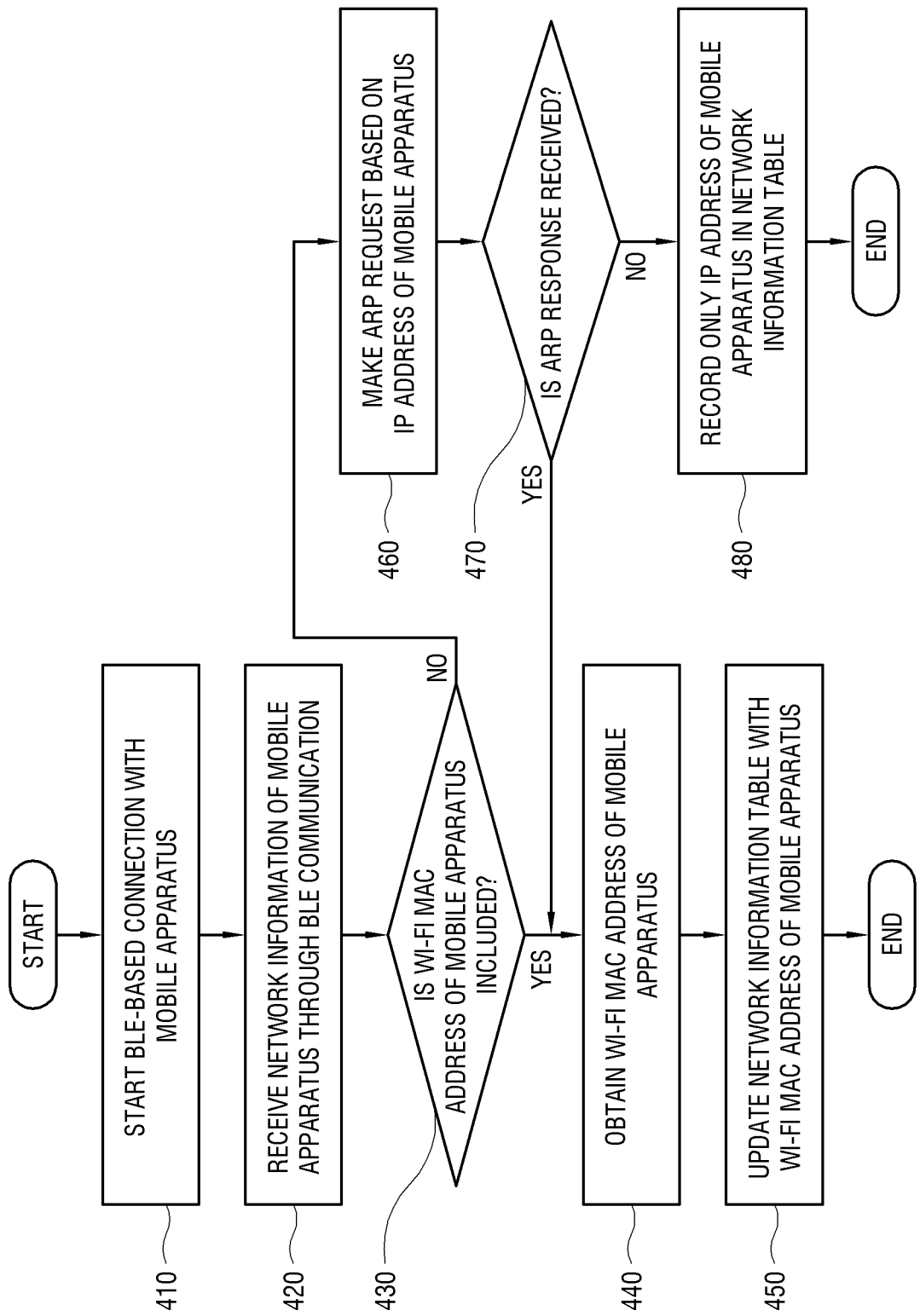
FIG. 4 is a flowchart illustrating example operations when a display apparatus obtains a Wi-Fi medium access control (MAC) address through an application (App) of a mobile apparatus at initial settings according to an example embodiment of the disclosure.

FIG. 4 is a flowchart illustrating example operations when a display apparatus obtains a Wi-Fi MAC address through an App of a mobile apparatus at initial settings according to an example embodiment of the disclosure.

As shown in FIG. 4, the following operations may be carried out by the processor of the display apparatus.

At operation 410 the display apparatus starts connection or pairing based on BLE with the mobile apparatus.

At operation 420 the display apparatus receives network information of the mobile apparatus from the mobile apparatus through BLE-based communication. The network information of the mobile apparatus may include, for example, an IP address of the mobile apparatus, identification information of an AP, e.g., basic service set identification (BSSID) of the AP, the Wi-Fi MAC address of the mobile apparatus, etc. The network information of the mobile apparatus may be obtained by an App executed in the mobile apparatus and transmitted to the display apparatus.

However, not all the Apps or the OS running in the mobile apparatus can obtain the Wi-Fi MAC address of the mobile apparatus. There is a mobile apparatus allowed to obtain the Wi-Fi MAC address through the App, while there is a mobile apparatus set in policy to be unable to obtain the Wi-Fi MAC address at an App level because the Wi-Fi MAC address is important information in terms of security. Therefore, according to the mobile apparatuses, the network information of the mobile apparatus may not contain the Wi-Fi MAC address of the mobile apparatus.

At operation 430 the display apparatus identifies whether the network information of the mobile apparatus contains the Wi-Fi MAC address of the mobile apparatus.

When the network information of the mobile apparatus contains the Wi-Fi MAC address of the mobile apparatus, at operation 440 the display apparatus obtains the Wi-Fi MAC address of the mobile apparatus.

At operation 450 the display apparatus updates a network information table with the obtained Wi-Fi MAC address of the mobile apparatus. According to the network information table, the display apparatus may perform both the BLE-based communication and the Wi-Fi-based communication, or perform one of the BLE-based communication and the Wi-Fi-based communication.

On the other hand, when the network information of the mobile apparatus does not contain the Wi-Fi MAC address of the mobile apparatus, at operation 460 the display apparatus requests an address resolution protocol (ARP) based on the IP address of the mobile apparatus. Details of the ARP will be described in greater detail below.

At operation 470 the display apparatus identifies whether an ARP response is received within a preset period of time after requesting the ARP. That the ARP response is received may refer, for example, to the mobile apparatus being connected to the same AP as the display apparatus. In this case, the mobile apparatus transmits the ARP response including the Wi-Fi MAC address of the mobile apparatus to the display apparatus in response to the ARP request. On the other hand, that the ARP response is not received may refer, for example, to the mobile apparatus not being connected to the same AP as the display apparatus. In this case, the mobile apparatus cannot receive the ARP request.

When the ARP response is received, the display apparatus enters the operation 440.

On the other hand, the Wi-Fi MAC address of the mobile apparatus is not obtained when the ARP response is not received, and at operation 480 the display apparatus records only the IP address in the network information table. The display apparatus periodically performs the subsequent processes, details of which will be described in detail.

The ARP may refer, for example, to a protocol used for matching the IP address with a physical network address on a LAN based on the IEEE 802 standards. The physical network address may refer, for example, to a 48-bits MAC address of an Ethernet or Wi-Fi chip. Because communication under a LAN environment is based on the MAC address, a certain apparatus needs to obtain both the MAC address and the IP address of a counterpart apparatus in order to carry out the IP communication with the counterpart apparatus.

According to the ARP, to obtain the Mac address of the counterpart apparatus under a condition that the IP address of the counterpart apparatus has already been obtained, an ARP request packet is sent as targeted at the IP address of the counterpart apparatus (e.g., a target IP address of an ARP request packet is set with a target address of the counterpart apparatus), and the apparatus which received the ARP request sends a ARP reply packet including its own MAC address in response to the ARP request. The IP address collected in this manner and physical network address information corresponding to the IP address are stored as a table form in an ARP cache memory of the apparatuses, and an ARP cache table is referenced whenever a packet is transmitted. By using the ARP protocol, it is possible to identify a list of apparatuses connected to the same AP.

The network information table will be described in greater detail below with reference to FIG. 5.

FIG. 5 is a diagram illustrating an example network information table tabulated by a display apparatus at initial settings according to an example embodiment of the disclosure.

As shown in FIG. 5, the display apparatus makes the ARP request and generates or updates a network information table 500 according to whether the ARP response is received or not. A series of processes where the display apparatus makes the ARP request and receives the ARP response corresponding to the ARP request or does not receives the ARP response may be referred to herein as an ARP check.

The network information table 500 includes the network information of the mobile apparatus, which is needed for the display apparatus to perform communication with the mobile apparatus. In an example embodiment, the network information table 500 shows illustrates the network information about the Wi-Fi-based communication, but may also include the network information about the BLE-based communication.

The network information table 500 may for example include "Mobile ID", e.g., the identification information of the mobile apparatus; "Wi-Fi MAC Detected" or "MAC Detected", e.g., flag information about whether the Wi-Fi MAC address of the mobile apparatus is obtained or not; "BLE MAC address", e.g., the physical network address of the BLE module recorded for BLE communication of the mobile apparatus; "Registered Wi-Fi MAC address" e.g., the physical network address of the Wi-Fi module recorded for the Wi-Fi communication of the mobile apparatus, "Last Connected IP address", e.g., the most recently identified ID address of the mobile apparatus, etc.

According to the network information table 500, the display apparatus does not obtain the Wi-Fi MAC address of the mobile apparatus having "Mobile ID" of '1', and thus "Wi-Fi MAC Detected" of the corresponding mobile apparatus shows '0'. On the other hand, the display apparatus obtains the Wi-Fi MAC addresses of the mobile apparatuses having "Mobile ID" of '2' and the mobile apparatuses having "Mobile ID" of '3', and thus "Wi-Fi MAC Detected" of the mobile apparatuses shows '1'. The subsequent processes of the display apparatus corresponding to the values of "Wi-Fi MAC Detected" will be described in greater detail below.

The display apparatus may perform the Wi-Fi-based communication with the mobile apparatus, based on the Wi-Fi MAC address and the IP address recorded in the network information table 500.

The foregoing cases that may occur in the initial settings will be described in greater detail below.

Figure 6:
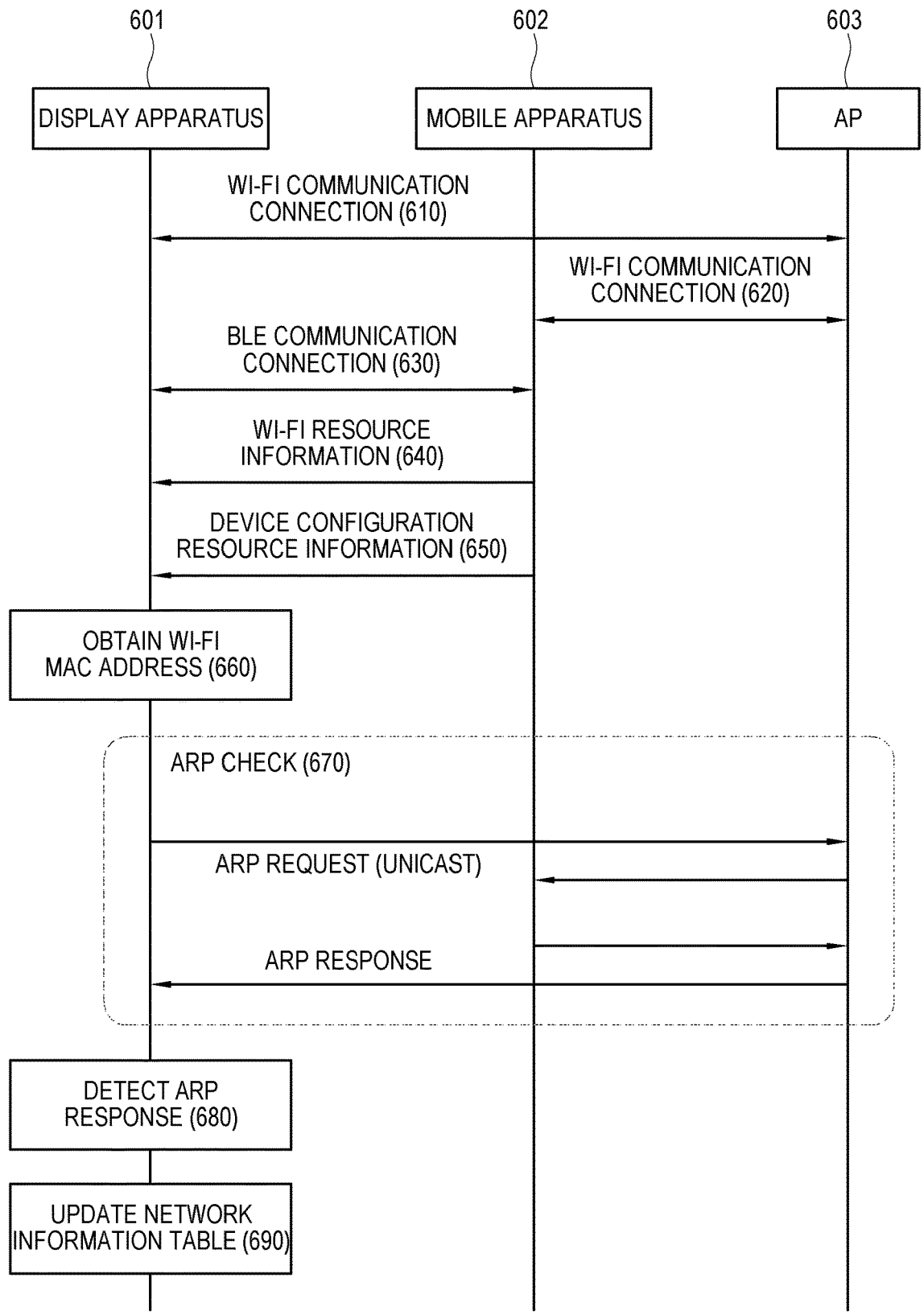
FIG. 6 is a signal flow diagram illustrating example signal flow between apparatuses when a display apparatus can obtain a Wi-Fi MAC address through Bluetooth low energy (BLE) communication according to an example embodiment of the disclosure.

FIG. 6 is a signal flow diagram illustrating example signal flow between apparatuses when a display apparatus can obtain a Wi-Fi MAC address through BLE communication according to an example embodiment of the disclosure.

As shown in FIG. 6, a system may include a display apparatus 601, a mobile apparatus 602, and an AP 603.

At operation 610 the display apparatus 601 is connected to the AP 603 for the Wi-Fi communication. However, in this operation, the display apparatus 601 is unable to perform first or second wireless communication with the mobile apparatus 602.

At operation 620 the mobile apparatus 602 is connected to the AP 603 for the Wi-Fi communication. However, in this operation, the Wi-Fi communication between the display apparatus 601 and the mobile apparatus 602 is impossible because the display apparatus 601 and the mobile apparatus 602 do not know each other's Wi-Fi MAC addresses. The AP 603 to which the mobile apparatus 602 is connected is equal to (e.g., same as) the AP 603 to which the display apparatus 601 is connected.

At operation 630 the display apparatus 601 establishes BLE-based communication connection with the mobile apparatus 602, thereby making it possible to perform the BLE communication. In this operation, the display apparatus 601 can obtain the IP address of the mobile apparatus 602.

At operation 640 the display apparatus 601 receives Wi-Fi resource information or Wi-Fi information including the BSSID of the AP 603 from the mobile apparatus 602 through the BLE communication.

At operation 650 the display apparatus 601 receives device configuration resource information including the Wi-Fi MAC address of the mobile apparatus 602 from the mobile apparatus 602 through the BLE communication.

At operation 660 the display apparatus 601 obtains the Wi-Fi MAC address of the mobile apparatus 602 from the device configuration resource information.

In an example embodiment, the display apparatus 601 obtains the Wi-Fi MAC address of the mobile apparatus 602, and thus at operation 670 the display apparatus 601 performs a unicast-based ARP check through the Wi-Fi communication with the AP 603. That is, the transmission of the ARP request from the display apparatus 601 is targeted at the mobile apparatus 602, and the mobile apparatus 602 transmits an ARP response to the display apparatus 601 in response to the ARP request.

At operation 680 the display apparatus 601 detects the ARP response received from the mobile apparatus 602. The detected ARP response may refer to the Wi-Fi MAC address of the mobile apparatus 602 obtained by the display apparatus 601 being valid.

At operation 690 the display apparatus 601 updates the value of "MAC Detected" or "Detection Flag" with '1' in the network information table, thereby recording that the Wi-Fi MAC address of the corresponding mobile apparatus 602 is obtained.

According to an example embodiment, the display apparatus 601 can obtain the Wi-Fi MAC address of the mobile apparatus 602 from the device configuration resource information received from the mobile apparatus 602 through the BLE communication. The operation 670 of the ARP check after obtaining the Wi-Fi MAC address of the mobile apparatus 602 is carried out at a level of verifying the obtained Wi-Fi MAC address.

Figure 7:
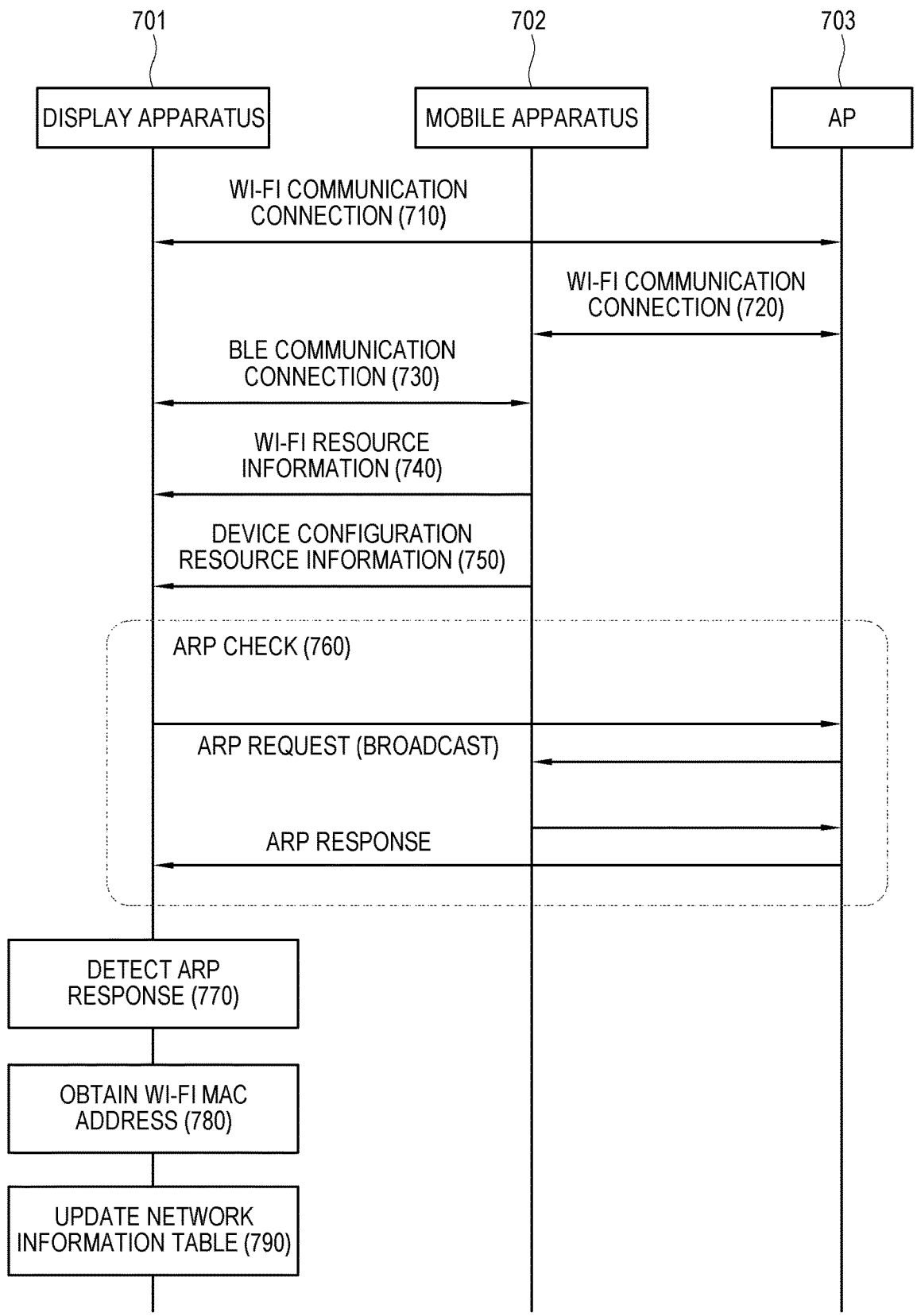
FIG. 7 is a signal flow diagram illustrating example signal flow between apparatuses when a display apparatus cannot obtain a Wi-Fi MAC address through BLE communication according to an example embodiment of the disclosure.

FIG. 7 is a signal flow diagram illustrating example signal flow between apparatuses when a display apparatus cannot obtain a Wi-Fi MAC address through BLE communication according to an example embodiment of the disclosure.

As shown in FIG. 7, a system includes a display apparatus 701, a mobile apparatus 702, and an AP 703.

At operation 710 the display apparatus 701 is connected to the AP 703 for the Wi-Fi communication.

At operation 720 the mobile apparatus 702 is connected to the AP 703 for the Wi-Fi communication.

At operation 730 the display apparatus 701 establishes BLE-based communication connection with the mobile apparatus 702, thereby making it possible to perform the BLE communication. In this operation, the display apparatus 701 can obtain the IP address of the mobile apparatus 702.

At operation 740 the display apparatus 701 receives the Wi-Fi resource information including the BSSID of the AP 703 from the mobile apparatus 702 through the BLE communication.

At operation 750 the display apparatus 701 receives the device configuration resource information from the mobile apparatus 702 through the BLE communication. However, in an example embodiment, the device configuration resource information from the mobile apparatus 702 does not contain the Wi-Fi MAC address of the mobile apparatus 702. Alternatively, it may be taken into account that the device configuration resource information is not received in the display apparatus 701. There are various causes of this case. For example, the OS or App of the mobile apparatus 702 may not be authorized to obtain the Wi-Fi MAC address, or the mobile apparatus 702 may be restricted to transmit the Wi-Fi MAC address to the display apparatus 701 through the BLE communication. Like this, such security-related issues may cause the device configuration resource information not to be received in the display apparatus 701.

Thus, the display apparatus 701 operates as follows to obtain the Wi-Fi MAC address.

At operation 760 the display apparatus 701 performs a broadcast-based ARP check through the Wi-Fi communication. That is, the display apparatus 701 transmits the ARP request to all the electronic apparatuses connected to the AP 703 through the AP 703. This ARP request includes the IP address of the mobile apparatus 702. All the electronic apparatuses connected to the AP 703 receive the ARP request in common, and each identify the IP address in the ARP request.

Among all the electronic apparatuses connected to the AP 703, only the mobile apparatus 702 identifies its own IP address in the ARP request, and transmits the ARP response to the display apparatus 701 in response to the ARP request. This ARP response contains the Wi-Fi MAC address of the mobile apparatus 702. The other electronic apparatuses ignore the ARP request because the IP address in the ARP request is not their own.

At operation 770 the display apparatus 701 detects the ARP response received from the mobile apparatus 702. The detected ARP response may refer, for example, to the mobile apparatus 702 and the display apparatus 701 being connected to the same AP 703, and the operation 760 of the ARP check is normally performed.

At operation 780 the display apparatus 701 obtains the Wi-Fi MAC address of the mobile apparatus 702 from the received ARP response.

At operation 790 the display apparatus 701 updates the value of "MAC Detected" or "Detection Flag" with '1' in the network information table, thereby recording that the Wi-Fi MAC address of the corresponding mobile apparatus 702 is obtained.

According to an example embodiment, the display apparatus 701 tries obtaining the Wi-Fi MAC address of the mobile apparatus 702 through the operation of the ARP check 760 when it is impossible to obtain the Wi-Fi MAC address of the mobile apparatus 702 from the device configuration resource information received from the mobile apparatus 702 through the BLE communication. When the display apparatus 701 and the mobile apparatus 702 are connected to the same AP 703, the display apparatus 701 may obtain the Wi-Fi MAC address of the mobile apparatus 702.

Figure 8:
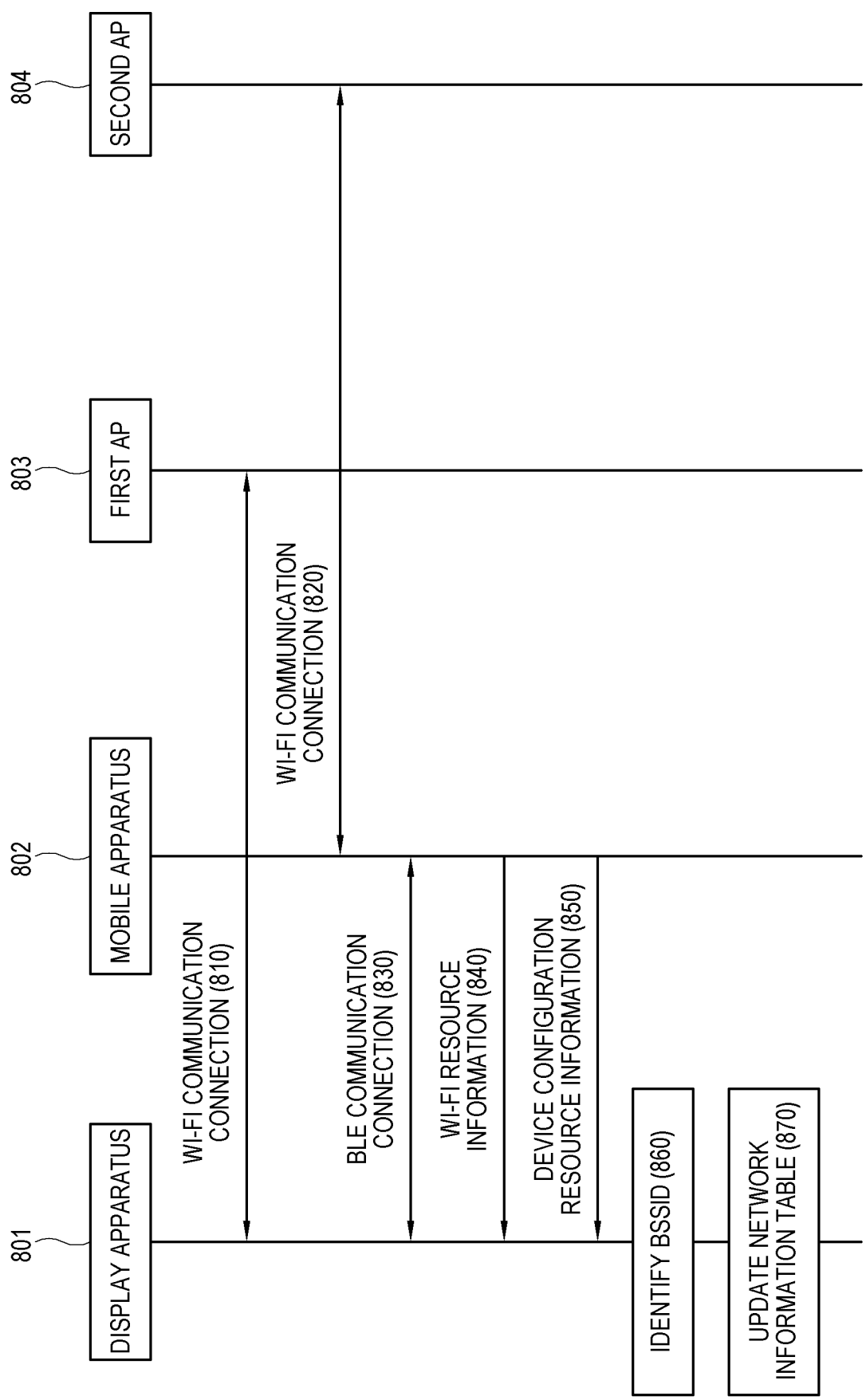
FIG. 8 is a signal flow diagram illustrating example signal flow between apparatuses when a display apparatus cannot obtain a Wi-Fi MAC address through BLE communication and the display apparatus and a mobile apparatus are respectively connected to different access points (AP) according to an example embodiment of the disclosure.

FIG. 8 is a signal flow diagram illustrating example signal flow between apparatuses when a display apparatus cannot obtain a Wi-Fi MAC address through BLE communication and the display apparatus and a mobile apparatus are respectively connected to different APs according to an example embodiment of the disclosure.

As shown in FIG. 8, a system includes a display apparatus 801, a mobile apparatus 802, a first AP 803, and a second AP 804. In an example embodiment, the system includes a plurality of APs 803 and 804.

At operation 810 the display apparatus 801 is connected to the first AP 803 for the Wi-Fi communication.

At operation 820 the mobile apparatus 802 is connected to the second AP 804 for the Wi-Fi communication. That is, in an example embodiment, the AP 803 to which the display apparatus 801 is connected is different from the AP 804 to which the mobile apparatus 802 is connected.

At operation 830 the display apparatus 801 establishes BLE-based communication connection with the mobile apparatus 802, thereby making it possible to perform the BLE communication. In this operation, the display apparatus 801 can obtain the IP address of the mobile apparatus 802.

At operation 840 the display apparatus 801 receives the Wi-Fi resource information including BSSID of the second AP 804 from the mobile apparatus 802 through BLE communication.

At operation 850 the display apparatus 801 receives the device configuration resource information from the mobile apparatus 802 through the BLE communication. In an example embodiment, the device configuration resource information from the mobile apparatus 802 does not contain the Wi-Fi MAC address of the mobile apparatus 802.

When the device configuration resource information does not contain the Wi-Fi MAC address of the mobile apparatus 802, at operation 860 the display apparatus 801 identifies the BSSID of the second AP 804 received from the mobile apparatus 802. For example, the display apparatus 801 compares the BSSID of the first AP 803 connecting therewith and the BSSID of the second AP 804 received from the mobile apparatus 802.

When the two are the same, the display apparatus 801 and the mobile apparatus 802 are connected to the same AP and is equivalent to the previous example embodiment. In this case, the display apparatus 801 can obtain the Wi-Fi MAC address of the mobile apparatus 802 through the ARP check.

On the other hand, when the two are different, the display apparatus 801 and the mobile apparatus 802 are respectively connected to different APs, and it is difficult to obtain the Wi-Fi MAC address of the mobile apparatus 802 through the ARP check.

Thus, at operation 870 the display apparatus 801 updates the value of "MAC Detected" or "Detection Flag" with '0' in the network information table, thereby recording that the Wi-Fi MAC address of the corresponding mobile apparatus 602 is not obtained.

In the previous example embodiments, at the initial settings using the App of the mobile apparatus 802, the display apparatus 801 tries obtaining the Wi-Fi MAC address of the mobile apparatus 802, and records information about the obtainment in the network information table. The network information table may be stored in the display apparatus 801 or the server.

The display apparatus 801 retries obtaining the Wi-Fi MAC address of the mobile apparatus 802 according to the records in the network information table. Such an example embodiment will be described in greater detail below.

Figure 9:
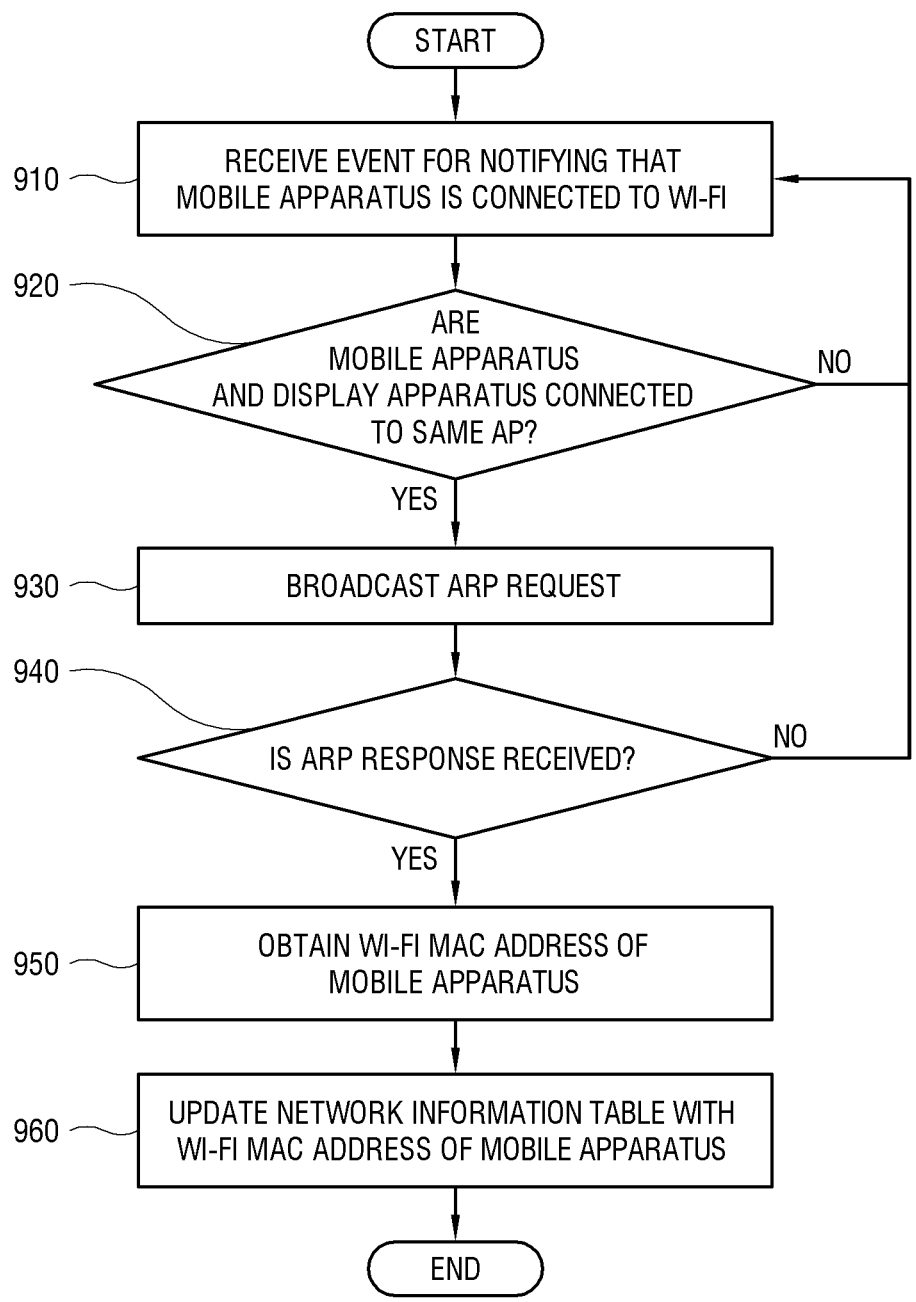
FIG. 9 is a flowchart illustrating an example method of retrying obtaining a Wi-Fi MAC address of a mobile apparatus, which cannot be obtained by a display apparatus at initial settings according to an example embodiment of the disclosure.

FIG. 9 is a flowchart illustrating an example method of retrying obtaining a Wi-Fi MAC address of a mobile apparatus, which cannot be obtained by a display apparatus at initial settings according to an example embodiment of the disclosure; As shown in FIG. 9, the following operations may be carried out by the processor of the display apparatus.

At operation 910 the display apparatus receives an event for notifying that the mobile apparatus is connected to Wi-Fi. This event includes the IP address of the mobile apparatus, and the BSSID of the AP to which the mobile apparatus is connected. This event may be transmitted from a server, which can communicate with the mobile apparatus and the display apparatus, to the display apparatus. For example, when the mobile apparatus is connected to the AP, the BSSID of the AP to which the mobile apparatus is connected and the IP address of the mobile apparatus are transmitted to the server. When the server receives such information from the mobile apparatus, the server transmits this event to the display apparatus which has been previously registered as related to the mobile apparatus.

The relationship between the mobile apparatus and the display apparatus may be variously identified. For example, when the mobile apparatus and the display apparatus are registered to one user account, the server may identify that they are related to each other.

At operation 920 the display apparatus identifies whether the mobile apparatus and the display apparatus are connected to the same AP. This identification is based on whether the BSSID of the AP to which the display apparatus is connected is equal to the BSSID of the AP to which the mobile apparatus is connected.

When the mobile apparatus and the display apparatus are connected to the same AP, at operation 930 the display apparatus broadcasts the ARP request to carry out the ARP check. On the other hand, when the mobile apparatus and the display apparatus are not connected to the same AP, it is impossible to perform the ARP check, and therefore the display apparatus waits for receiving the next event.

At operation 940 the display apparatus identifies whether the ARP response is received. When the ARP response is not received for a preset period of time, the display apparatus repeats transmitting the ARP request. When the number of times the ARP request is transmitted again is above a threshold, the ARP check is not carried out, and therefore the display apparatus waits until the next event is received.

When the ARP response is received, at operation 950 the display apparatus obtains the Wi-Fi MAC address of the mobile apparatus from the ARP response.

At operation 960 the display apparatus updates the network information table with the obtained Wi-Fi MAC address of the mobile apparatus.

Because the mobile apparatus is carried and moved by a user, the mobile apparatus may be connected to the AP, to which the display apparatus is connected, according to movement of the mobile apparatus. Therefore, although the display apparatus cannot obtain the Wi-Fi MAC address of the mobile apparatus at the previous initial settings, the display apparatus may retry obtaining the Wi-Fi MAC address of the mobile apparatus by performing a new ARP check.

It will be described in greater detail below, by way of example, that the display apparatus transmits a request for Wi-Fi information of a mobile apparatus to the mobile apparatus after the initial settings.

Figure 10:
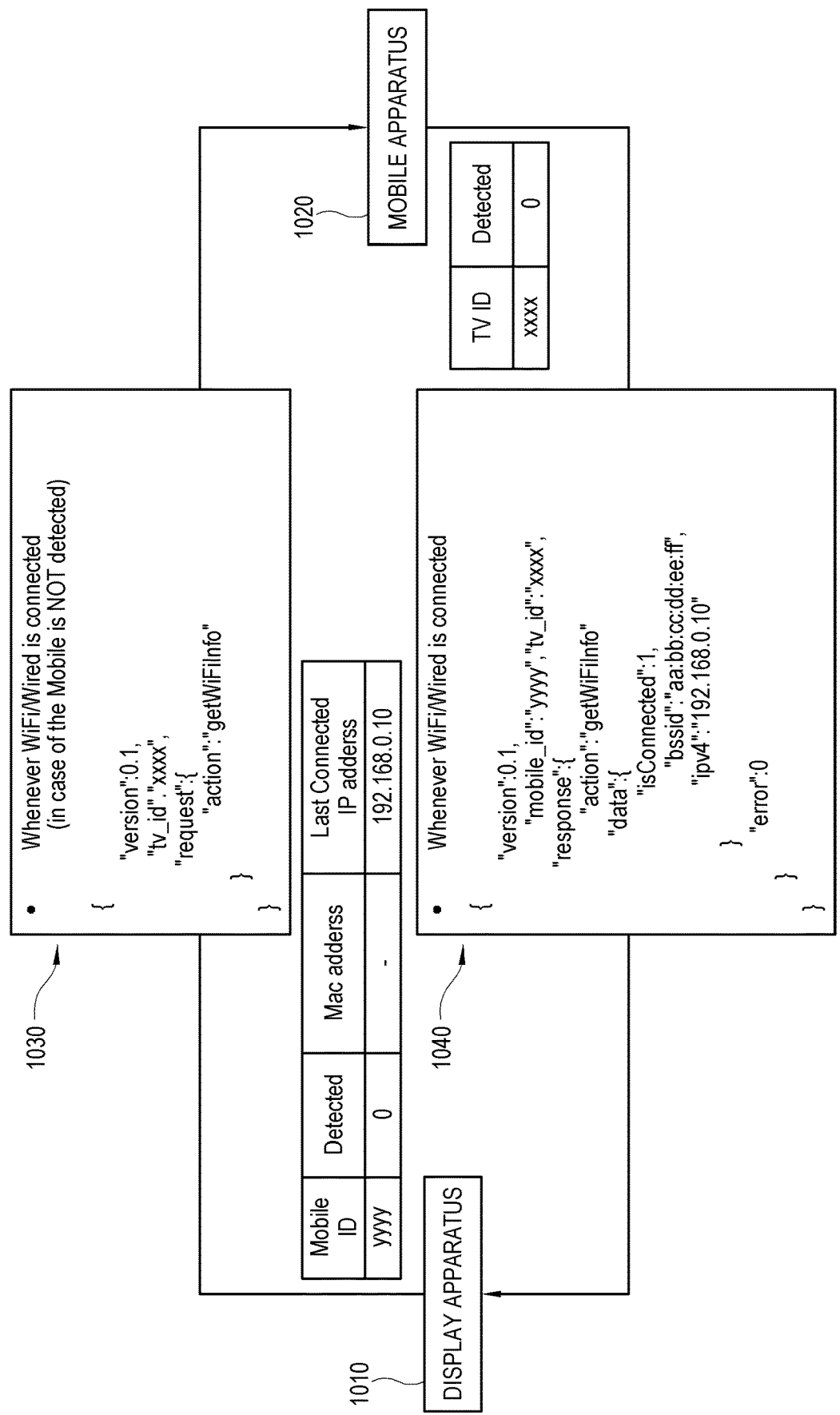
FIG. 10 is a diagram illustrating an example of when a display apparatus transmits a request for Wi-Fi information of a mobile apparatus to the mobile apparatus according to an example embodiment of the disclosure.

FIG. 10 is a diagram illustrating an example in which a display apparatus transmits a request for Wi-Fi information of a mobile apparatus to the mobile apparatus according to an example embodiment of the disclosure.

As shown in FIG. 10, a display apparatus 1010 searches for a mobile apparatus 1020, of which "Detected Flag" is '0', in the network information table in response to the Wi-Fi communication connection or wired connection with the mobile apparatus 1020, or the like event. When the mobile apparatus 1020, of which "Detected Flag" is '0', e.g., the mobile apparatus 1020 of which the Wi-Fi MAC address is not obtained is found, the display apparatus 1010 transmits a message 1030 of "getWiFiInfo" to make a request for the Wi-Fi information to the mobile apparatus 1020. This message 1030 includes the ID of the display apparatus 1010.

In response to the message 1030 of "getWiFiInfo", the mobile apparatus 1020 identifies whether the mobile apparatus 1020 is connected to a predetermined AP. When it is identified that the mobile apparatus 1020 is connected to a predetermined AP, the mobile apparatus 1020 transmits a response message 1040 including a flag value for indicating that the mobile apparatus 1020 is connected to the AP, the BASSID of the AP to which the mobile apparatus 1020 is connected, the IP address of the mobile apparatus 1020, etc.

When the display apparatus 1010 receives the response message 1040, the display apparatus 1010 identifies whether the display apparatus 1010 and the mobile apparatus 1020 are connected to the same AP by checking the BSSID of the response message 1040.

On the other hand, when the mobile apparatus 1020 is not connected to any AP, the mobile apparatus 1020 transmits a response message including a flag value for indicating that the mobile apparatus is not connected to the AP. In this case, the response message does not include the BSSID of the AP and the IP address of the mobile apparatus 1020, and therefore the display apparatus 1010 does not perform a corresponding operation.

Meanwhile, the mobile apparatus may transmit the Wi-Fi information even though it is not requested by the display apparatus.

Figure 11:
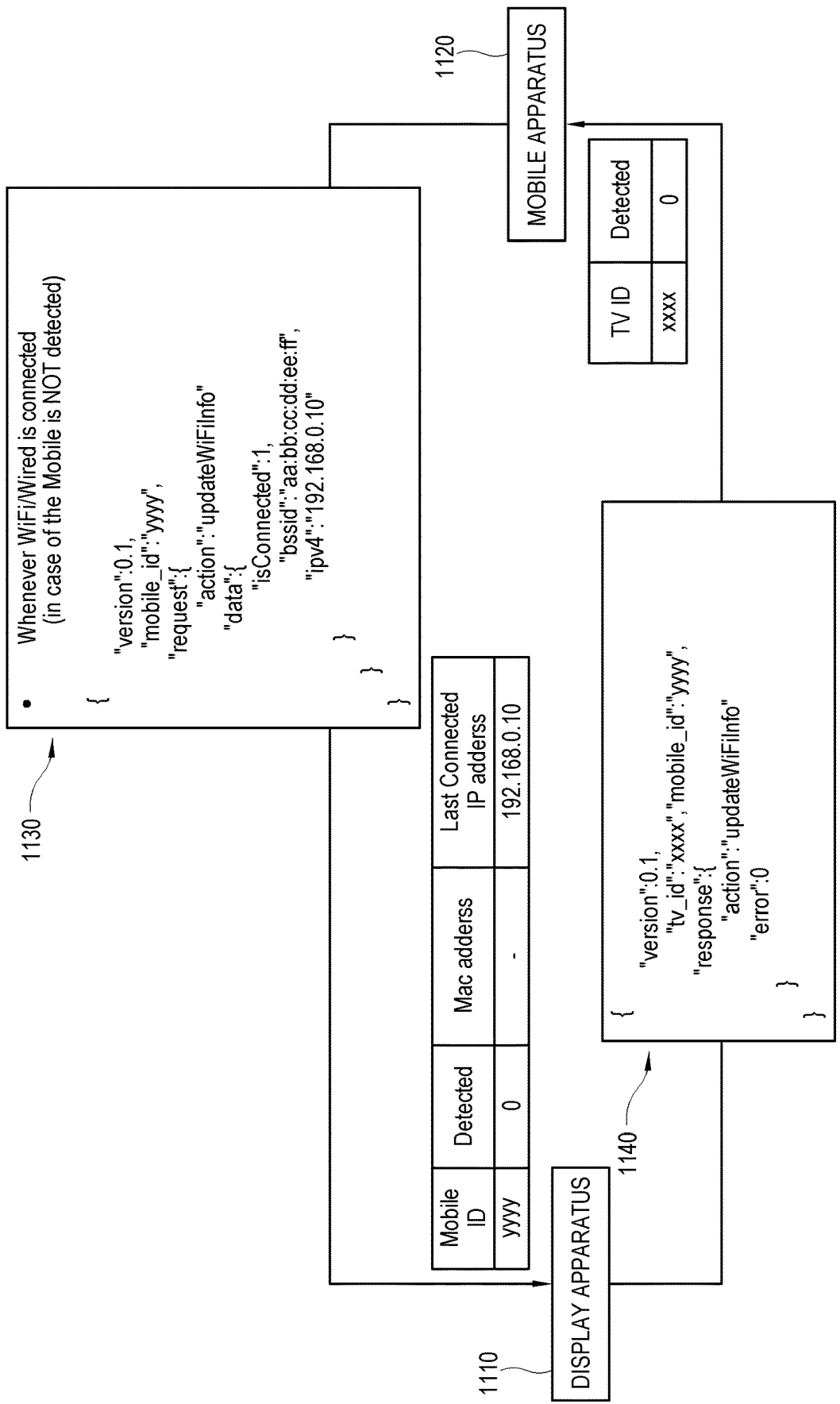
FIG. 11 is a diagram illustrating an example of when a mobile apparatus transmits Wi-Fi information without receiving a request from a display apparatus according to an example embodiment of the disclosure.

FIG. 11 is a diagram illustrating an example in which a mobile apparatus transmits Wi-Fi information without receiving a request from a display apparatus according to an example embodiment of the disclosure.

As shown in FIG. 11, a mobile apparatus 1120 is connected to the AP for the Wi-Fi communication and searches whether there is a display apparatus 1110 of which "Detected Flag" is '0' in the network information table. The mobile apparatus 1120 may also store the network information table therein. When the mobile apparatus 1120 transmits the Wi-Fi MAC address of the mobile apparatus 1120 to the display apparatus 1110 at the initial settings, "Detected Flag" corresponding to the ID of the display apparatus 1110 is updated with '1' in the network information table. On the other hand, when the mobile apparatus 1120 does not transmit the Wi-Fi MAC address of the mobile apparatus 1120 to the display apparatus 1110, "Detected Flag" is updated with '0'.

When the display apparatus 1110 of which "Detected Flag" is '0' is found, the mobile apparatus 1120 transmits a message 1130 of "updateWiFiInfo" including the Wi-Fi information of the mobile apparatus 1120 to the corresponding display apparatus 1110. The message 1130 of "updateWiFiInfo" transmitted to the display apparatus 1110 includes a flag value for indicating that the mobile apparatus 1120 is connected to the AP, the BSSID of the AP to which the mobile apparatus 1120 is connected, and the IP address of the mobile apparatus 1120.

The display apparatus 1110 identifies whether the display apparatus 1110 and the mobile apparatus 1120 are connected to the same AP, based on the BSSID of the AP recorded in the received message 1130 of "updateWiFiInfo". The display apparatus 1110 transmits a response message 1140 including the identification result to the mobile apparatus 1120.

It will be described in greater detail below, by way of example, that the display apparatus 1110 cannot obtain the Wi-Fi MAC address of the mobile apparatus 1120 at the initial settings, and the mobile apparatus 1120 is connected to the same AP as the display apparatus 1110.

Figure 12:
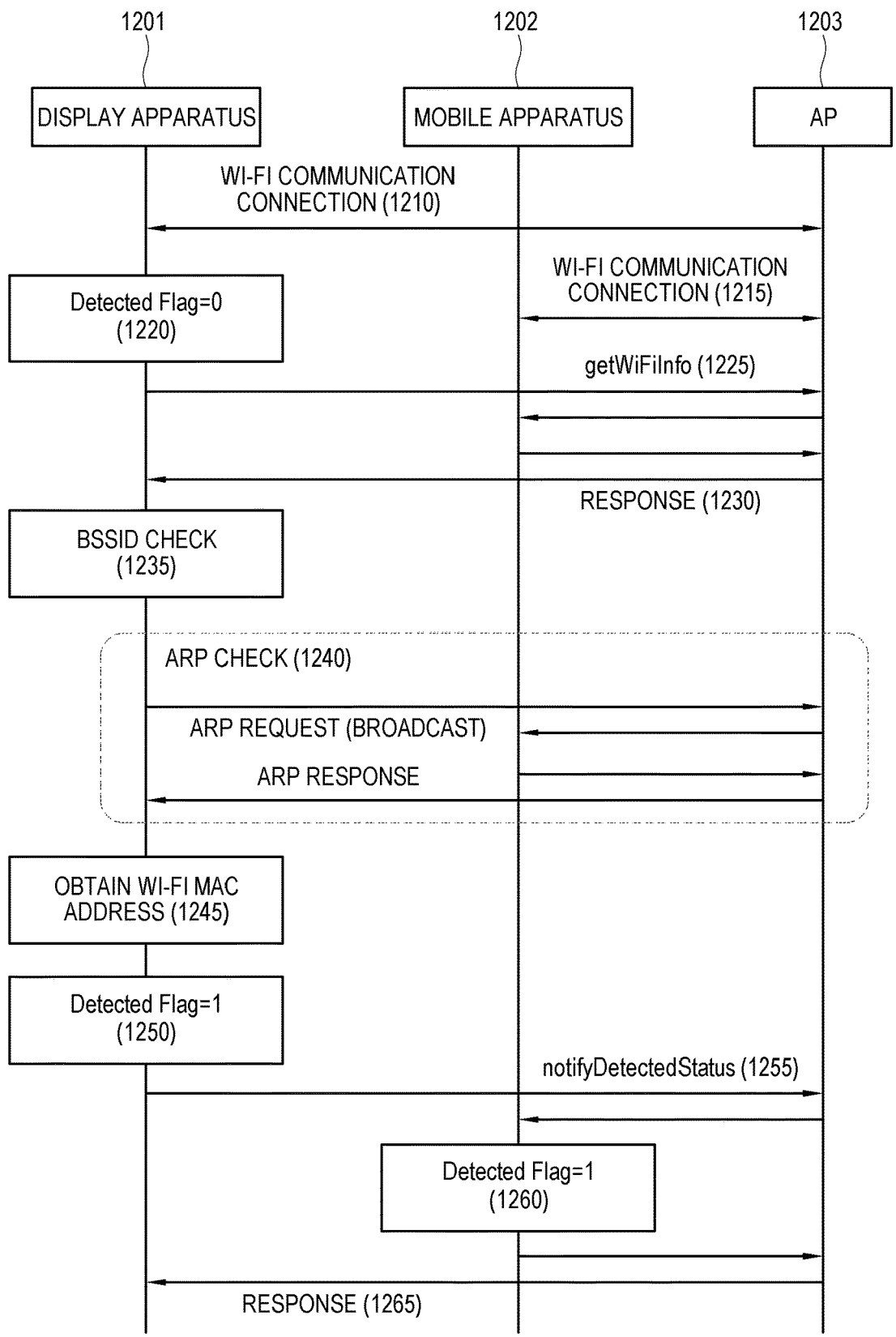
FIG. 12 is a signal flow diagram illustrating example signal flow between apparatuses when a display apparatus reobtains a Wi-Fi MAC address of a mobile apparatus connected to the same AP after initial settings according to an example embodiment of the disclosure.

FIG. 12 is a signal flow illustrating example signal flow between apparatuses when a display apparatus reobtains a Wi-Fi MAC address of a mobile apparatus connected to the same AP after initial settings according to an example embodiment of the disclosure.

As shown in FIG. 12, a system includes a display apparatus 1201, a mobile apparatus 1202, and an AP 1203.

At operation 1210 the display apparatus 1201 is connected to the AP 1203 and thus enabled to perform the Wi-Fi communication.

At operation 1215 the mobile apparatus 1202 is connected to the AP 1203 and thus enabled to perform the Wi-Fi communication.

At operation 1220 the display apparatus 1201 searches in the previously stored network information table for the mobile apparatus 1202 of which "Detected Flag" is 0, e.g., the mobile apparatus 1202 of which the Wi-Fi MAC address is not obtained at the previous initial settings.

At operation 1225 the display apparatus 1201 transmits a message of "getWiFiInfo" to request for the Wi-Fi information of the mobile apparatus 1202 to the corresponding mobile apparatus 1202 through the Wi-Fi communication with the AP 1203.

At operation 1230 the mobile apparatus 1202 transmits a response to the display apparatus 1201 via the AP 1203 in response to the received message of "getWiFiInfo". This response includes the BSSID of the AP 1203 to which the mobile apparatus 1202 is connected.

At operation 1235 the display apparatus 1201 checks the BSSID included in the received response and identifies whether the display apparatus 1201 and the mobile apparatus 1202 are connected to the same AP 1203.

When the display apparatus 1201 and the mobile apparatus 1202 are connected to the same AP 1203, at operation 1240 the display apparatus 1201 performs the ARP check. The display apparatus 1201 broadcasts an ARP request through the AP 1203. This ARP request includes the IP address of the mobile apparatus 1202. The mobile apparatus 1202 identifies its own IP address in the ARP request, and transmits the ARP response including the Wi-Fi MAC address of the mobile apparatus 1202 to the display apparatus 1201.

At operation 1245 the display apparatus 1201 obtains the Wi-Fi MAC address of the mobile apparatus 1202 from the received ARP response.

At operation 1250 the display apparatus 1201 updates "Detection Flag" with '1' in the network information table, thereby recording that the Wi-Fi MAC address of the corresponding mobile apparatus 1202 is obtained.

At operation 1255 the display apparatus 1201 transmits a message of "notifyDetectedStatus", which notifies that the Wi-Fi MAC address of the mobile apparatus 1202 is obtained through the ARP check, to the mobile apparatus 1202.

At operation 1260, when the mobile apparatus 1202 receives the message of "notifyDetectedStatus", the mobile apparatus 1202 updates "Detected Flag" of the display apparatus 1201 with '1' in the network information table stored therein, thereby notifying that the Wi-Fi MAC address of the mobile apparatus 1202 is normally transmitted to the display apparatus 1201.

At operation 1265 the mobile apparatus 1202 transmits a response, which notifies that the message of "notifyDetectedStatus" is normally received, to the display apparatus 1201.

Figure 13:
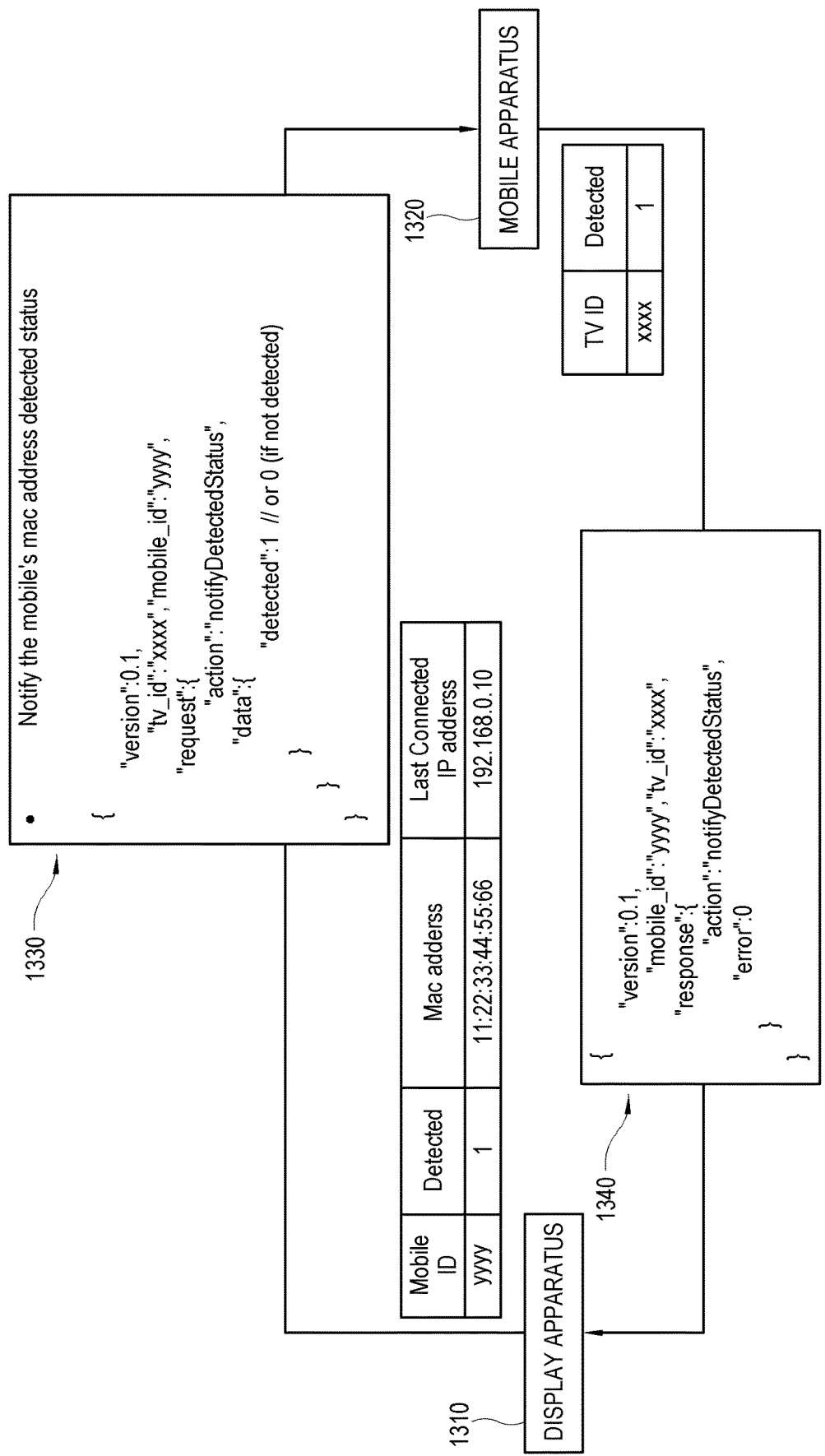
FIG. 13 is a diagram illustrating an example of transmitting information to inform a mobile apparatus that a display apparatus normally obtains a Wi-Fi MAC address according to an example embodiment of the disclosure.

FIG. 13 is a diagram illustrating an example of transmitting information to inform a mobile apparatus that a display apparatus normally obtains a Wi-Fi MAC address according to an example embodiment of the disclosure.

As shown in FIG. 13, when a display apparatus 1310 normally obtains the Wi-Fi MAC address from the mobile apparatus 1320, the Wi-Fi MAC address of the mobile apparatus 1320 is recorded in the network information table stored in the display apparatus 1310, and "Detected Flag" is updated with '1'. Further, the display apparatus 1310 transmits a message 1330 of "notifyDetectedStatus", which notifies that the Wi-Fi MAC address of the mobile apparatus 1320 is obtained, to the mobile apparatus 1320.

When the mobile apparatus 1320 receives the message 1330 of "notifyDetectedStatus", "Detected Flag" corresponding to the ID of the display apparatus 1310 is updated with '1' in the network information table stored in the mobile apparatus 1320. Further, the mobile apparatus 1320 transmits a response message 1340, which notifies that update is normally performed based on the message 1330 of "notifyDetectedStatus", to the display apparatus 1310.

Figure 14:
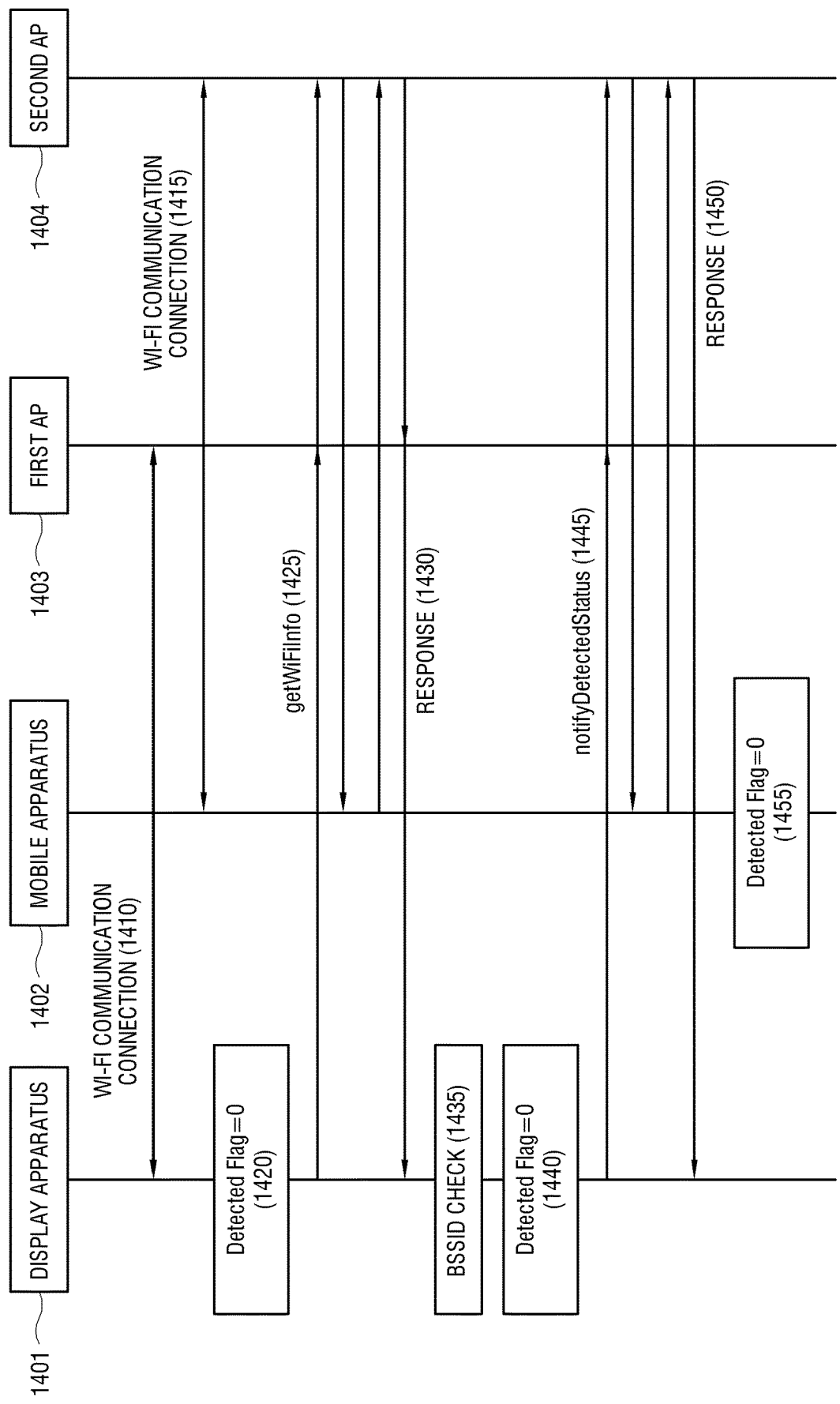
FIG. 14 is a signal flow diagram illustrating an example in which a display apparatus and a mobile apparatus are respectively connected to different APs when the display apparatus reobtains a Wi-Fi MAC address after initial settings according to an example embodiment of the disclosure.

FIG. 14 is a signal flow diagram illustrating an example in which a display apparatus and a mobile apparatus are respectively connected to different APs when the display apparatus reobtains a Wi-Fi MAC address after initial settings according to an example embodiment of the disclosure.

As shown in FIG. 14, a system includes a display apparatus 1401, a mobile apparatus 1402, a first AP 1403, and a second AP 1404. In this example embodiment, the system includes a plurality of APs 1403 and 1404.

At operation 1410 the display apparatus 1401 is connected to the first AP 1403 for the Wi-Fi communication.

At operation 1415 the mobile apparatus 1402 is connected to the second AP 1404 for the Wi-Fi communication.

At operation 1420 the display apparatus 1401 searches in the previously stored network information table for the mobile apparatus 1402 of which "Detected Flag" is '0', e.g., the mobile apparatus 1402 of which the Wi-Fi MAC address is not obtained at the previous initial settings.

At operation 1425 the display apparatus 1401 transmits a message of "getWiFiInfo" to request for the Wi-Fi information of the mobile apparatus 1402 to the corresponding mobile apparatus 1402 through the Wi-Fi communication. Because the first AP 1403 and the second AP 1404 are connected to the WLAN, communication between the first AP 1403 and the second AP 1404 is possible.

At operation 1430 the mobile apparatus 1402 transmits a response to the display apparatus 1401 in response to the received message of "getWiFiInfo". This response includes the BSSID of the second AP 1404 to which the mobile apparatus 1402 is connected.

At operation 1435 the display apparatus 1401 checks the BSSID included in the received response, and identifies whether the display apparatus 1401 and the mobile apparatus 1402 are connected to the same AP.

When the BSSID of the first AP 1403 the display apparatus 1401 has is different from the BSSID of the second AP 1404 included in the response received from the mobile apparatus 1402, the display apparatus 1401 and the mobile apparatus 1402 are respectively connected to different APs. Therefore, the display apparatus 1401 does not perform the ARP check.

Thus, at operation 1440 the display apparatus 1401 maintains "Detected Flag" of the mobile apparatus 1402 at '0' in the network information table.

At operation 1445 the display apparatus 1401 transmits a message of "notifyDetectedStatus", which notifies that the Wi-Fi MAC address of the mobile apparatus 1402 is not obtained through the ARP check, to the mobile apparatus 1402. In this case, the message of "notifyDetectedStatus" may contain an instruction issued to notify a user of the mobile apparatus 1402 of change in the AP or connection change into the first AP 1403.

At operation 1450 the mobile apparatus 1402 transmits a response, which notifies that the message of "notifyDetectedStatus" is normally received, to the display apparatus 1401. When the message of "notifyDetectedStatus" includes the message, the mobile apparatus 1402 may display the corresponding message, or a user interface (UI) through which the AP for connection with the mobile apparatus 1402 is changed according to the messages.

At operation 1455 the mobile apparatus 1402 maintains "Detected Flag" of the display apparatus 1401 at '0' in the network information table stored therein, according to the message of "notifyDetectedStatus", thereby indicating that the Wi-Fi MAC address of the mobile apparatus 1402 is not transmitted to the display apparatus 1401.

In the foregoing example embodiments, it was described that the display apparatus carries out a trigger operation to obtain the Wi-Fi MAC address of the mobile apparatus. However, such a trigger operation may also be performed in the mobile apparatus, and this will be described in greater detail below.

Figure 15:
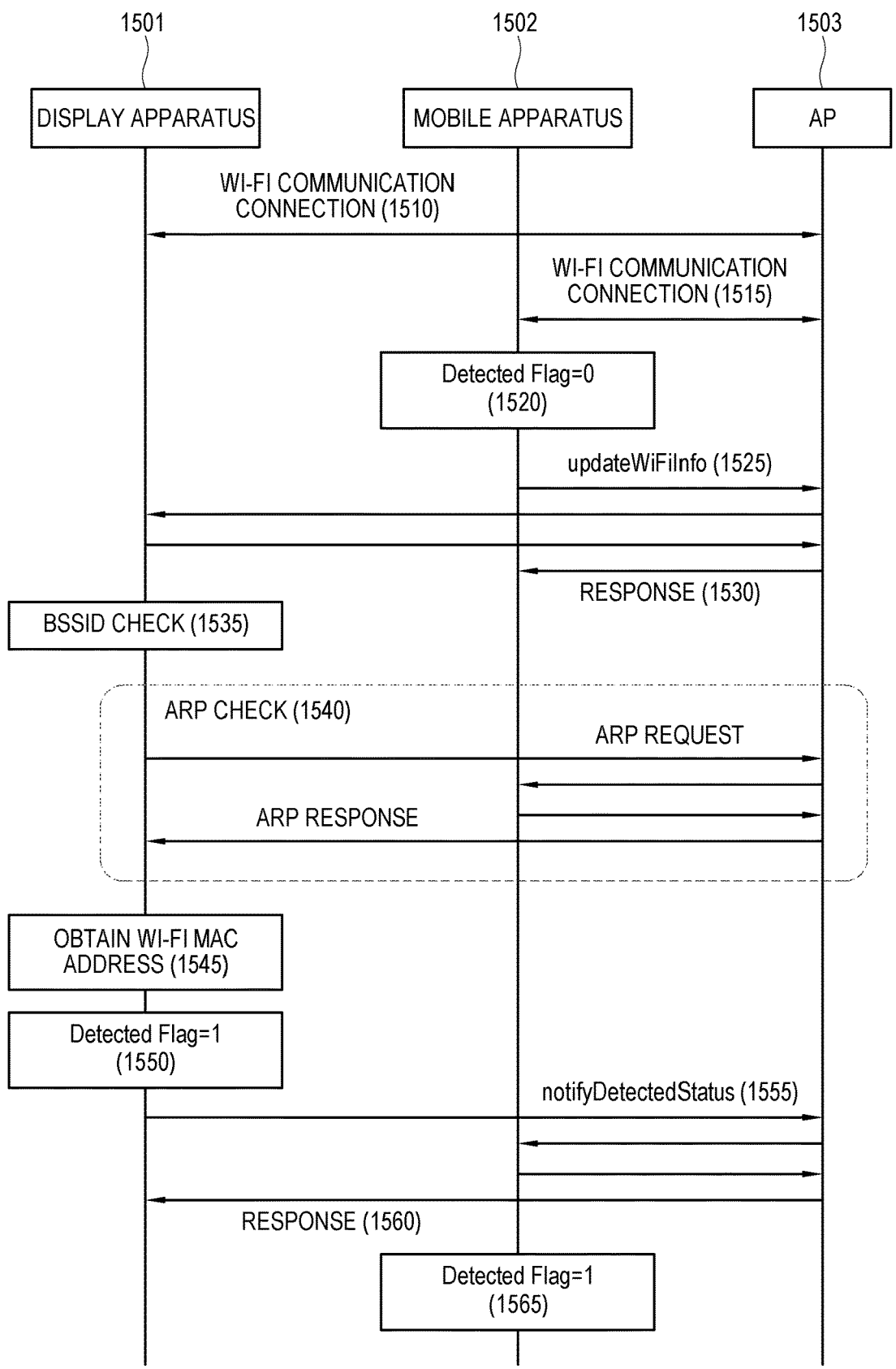
FIG. 15 is a signal flow diagram illustrating an example in which a mobile apparatus transmits a request for information about a display apparatus to the display apparatus after initial settings according to an example embodiment of the disclosure.

FIG. 15 is a signal flow diagram in which a mobile apparatus transmits a request for information about a display apparatus to the display apparatus after initial settings according to an example embodiment of the disclosure.

As shown in FIG. 15, a system includes a display apparatus 1501, a mobile apparatus 1502, and an AP 1503.

At operation 1510 the display apparatus 1501 is connected to the AP 1503 and thus enabled to perform the Wi-Fi communication.

At operation 1515 the mobile apparatus 1502 is connected to the AP 1503 and thus enabled to perform the Wi-Fi communication. Thus, the display apparatus 1501 and the mobile apparatus 1502 are being connected to the same AP 1503.

At operation 1520 the mobile apparatus 1502 searches in the previously stored network information table for the display apparatus 1501 of which "Detected Flag" is '0', when connected to the AP 1503. That is, the mobile apparatus 1502 identifies whether the ID of the display apparatus 1501, which cannot transmit the Wi-Fi MAC address of the mobile apparatus 1502, is present among the IDs of the display apparatuses 1501 in the network information table.

When there is a display apparatus 1501 of which "Detected Flag" is '0,' at operation 1525 the mobile apparatus 1502 transmits a message of "updateWiFiInfo" including the Wi-Fi information of the mobile apparatus 1502 through the Wi-Fi communication.

At operation 1530 the display apparatus 1501 transmits a response, which notifies that the message of "updateWiFiInfo" is normally received, to the mobile apparatus 1502.

At operation 1535 the display apparatus 1501 checks the BSSID included in the message of "updateWiFiInfo" and identifies whether the display apparatus 1501 and the mobile apparatus 1502 are connected to the same AP 1503.

When the display apparatus 1501 and the mobile apparatus 1502 are connected to the same AP 1503, at operation 1540 the display apparatus 1501 performs the ARP check. The display apparatus 1501 transmits an ARP request through the AP 1503. The ARP request includes the IP address of the mobile apparatus 1502. The mobile apparatus 1502 identifies its own IP address in the ARP request, and an ARP response including the Wi-Fi MAC address of the mobile apparatus 1502 to the display apparatus 1501.

At operation 1545 the display apparatus 1501 obtains the Wi-Fi MAC address of the mobile apparatus 1502 from the received ARP response.

At operation 1550 the display apparatus 1501 updates "Detection Flag" with '1' in the network information table, thereby recording that the Wi-Fi MAC address of the mobile apparatus 1502 is obtained.

At operation 1555 the display apparatus 1501 transmits the message of "notifyDetectedStatus", which indicates that the Wi-Fi MAC address of the mobile apparatus 1502 is obtained through the ARP check, to the mobile apparatus 1502.

At operation 1560 the mobile apparatus 1502 transmits a response, which notifies that the message of "notifyDetectedStatus" is normally received, to the display apparatus 1501.

At operation 1565 the mobile apparatus 1502 updates "Detected Flag" of the display apparatus 1501 with '1' in the network information table stored therein, thereby indicating that the Wi-Fi MAC address of the mobile apparatus 1502 is normally transmitted to the display apparatus 1501.

Figure 16:
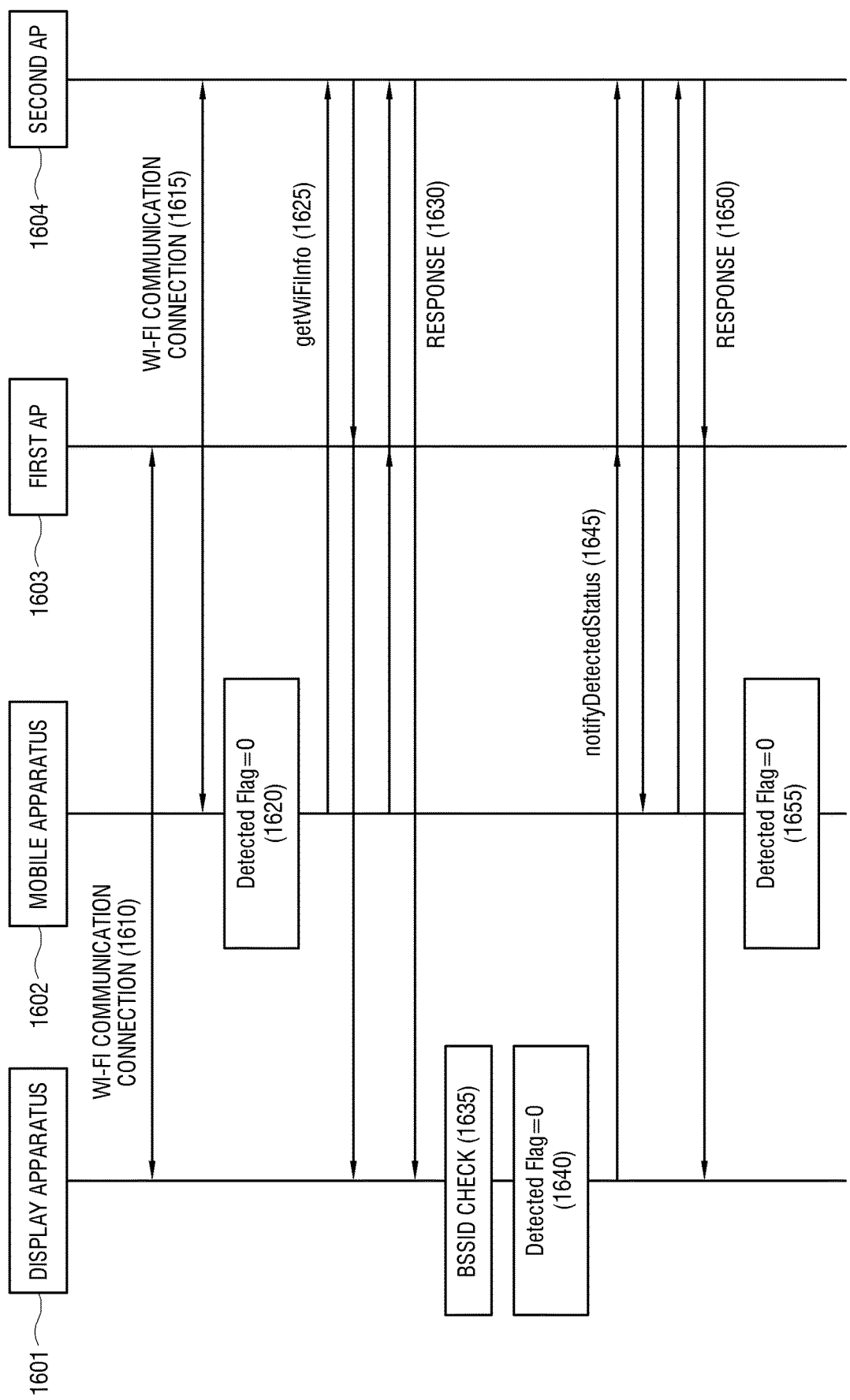
FIG. 16 is a signal flow diagram illustrating an example in which a mobile apparatus and a display apparatus are respectively connected to different APs when the mobile apparatus transmits a request for information about the display apparatus to the display apparatus after initial settings according to an example embodiment of the disclosure.

FIG. 16 is a signal flow diagram illustrating an example in which a mobile apparatus and a display apparatus are respectively connected to different APs when the mobile apparatus transmits a request for information about the display apparatus to the display apparatus after initial settings according to an example, embodiment of the disclosure.

As shown in FIG. 16, a system includes a display apparatus 1601, a mobile apparatus 1602, a first AP 1603, and a second AP 1604. In this example embodiment, the system includes a plurality of APs 1603 and 1604.

At operation 1610 the display apparatus 1601 is connected to the first AP 1603 for the Wi-Fi communication.

At operation 1615 the mobile apparatus 1602 is connected to the second AP 1604 for the Wi-Fi communication.

At operation 1620 the mobile apparatus 1602 searches in the previously stored network information table for the display apparatus 1601 of which "Detected Flag" is '0', when connected to the second AP 1604. That is, the mobile apparatus 1602 identifies whether the ID of the display apparatus 1601, which cannot transmit the Wi-Fi MAC address of the mobile apparatus 1502, is present among the IDs of the display apparatuses 1601 in the network information table.

When there is a display apparatus 1601 of which "Detected Flag" is '0,' at operation 1625 the mobile apparatus 1602 transmits a message of "updateWiFiInfo" including the Wi-Fi information of the mobile apparatus 1602 through the Wi-Fi communication.

At operation 1630 the display apparatus 1601 transmits a response, which notifies that the message of "updateWiFiInfo" is normally received, to the mobile apparatus 1602.

At operation 1635 the display apparatus 1601 checks the BSSID included in the message of "updateWiFiInfo", and identifies whether the display apparatus 1601 and the mobile apparatus 1602 are connected to the same AP.

When the display apparatus 1601 and the mobile apparatus 1602 are respectively connected to different APs, the display apparatus 1601 does not perform the ARP check. Thus, at operation 1640 the display apparatus 1601 maintains "Detected Flag" of the mobile apparatus 1602 at '0' in the network information table.

At operation 1645 the display apparatus 1601 transmits the message of "notifyDetectedStatus", which notifies that the Wi-Fi MAC address of the mobile apparatus 1602 is not obtained through the ARP check, to the mobile apparatus 1602

At operation 1650 the mobile apparatus 1602 transmits a response, which notifies that the message of "notifyDetectedStatus" is normally received, to the display apparatus 1601.

At operation 1655 the mobile apparatus 1602 maintains "Detected Flag" of the display apparatus 1601 at '0' in the network information table stored therein, according to the message of "notifyDetectedStatus", thereby indicating that the Wi-Fi MAC address of the mobile apparatus 1602 is not transmitted to the display apparatus 1601.

Like the foregoing example embodiments, when the Wi-Fi MAC address of the mobile apparatus is obtained, the display apparatus periodically performs the ARP check, thereby identifying whether the mobile apparatus is present on the Wi-Fi the network. This operation is needed is because the IP address off the mobile apparatus may be varied during use. For convenience of description, such an operation will be called a Wi-Fi presence check, and this will be described in greater detail below.

Figure 17:
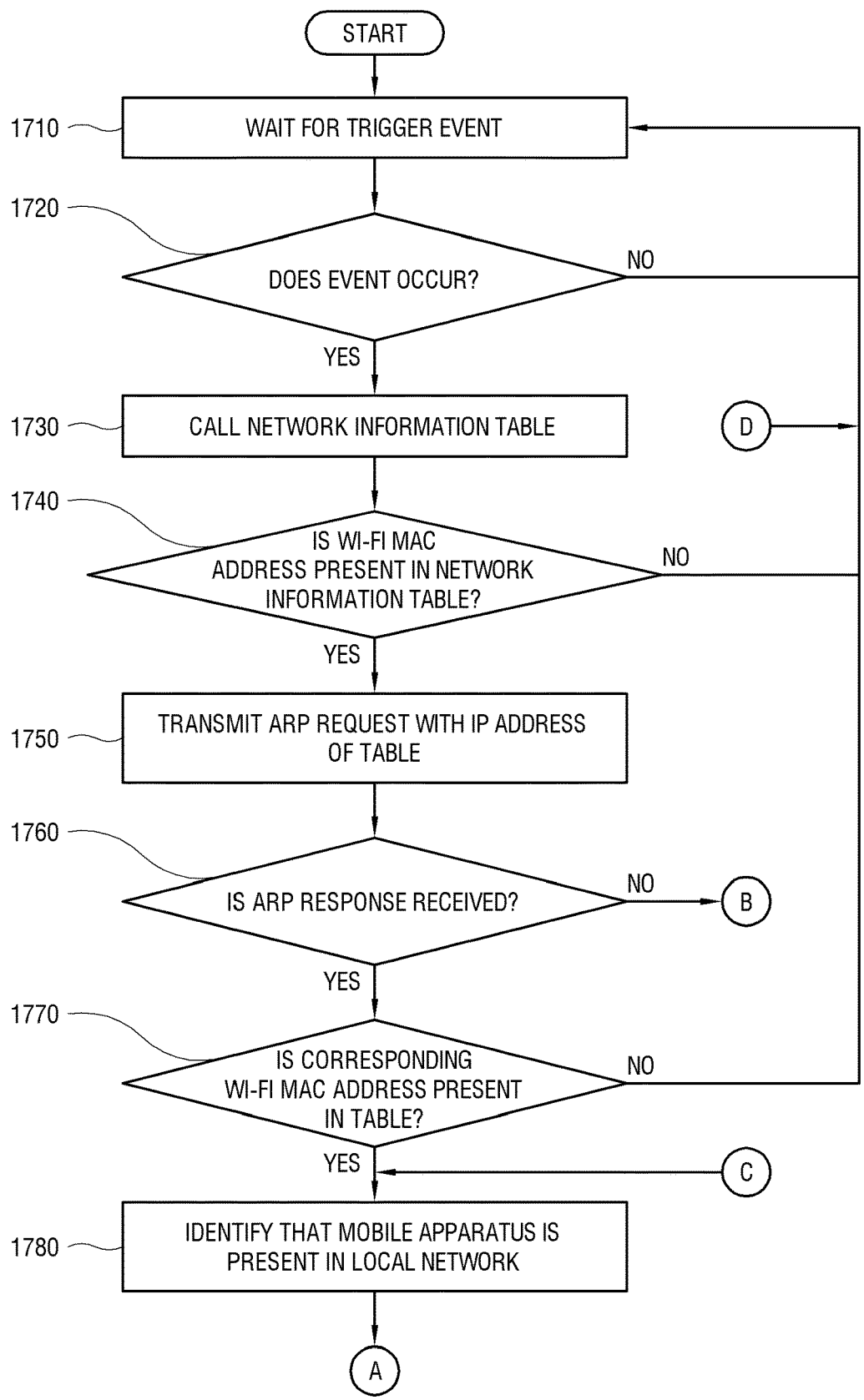
FIG. 17 is a flowchart illustrating an example process that a display apparatus identifies whether an IP address of a previously connected mobile apparatus is valid according to an example embodiment of the disclosure.

FIG. 17 is a flowchart illustrating an example process that a display apparatus identifies whether an IP address of a previously connected mobile apparatus is valid according to an example embodiment of the disclosure.

As shown in FIG. 17, the following operations are performed by the processor of the display apparatus periodically after the display apparatus obtains the Wi-Fi MAC address and the IP address of the mobile apparatus.

At operation 1710 the display apparatus waits for a trigger event to perform the Wi-Fi presence check.

At operation 1720 the display apparatus identifies whether the event occurs. When the event does not occur, the display apparatus returns to the operation 1710 and waits until the event occurs.

When the event occurs, at operation 1730 the display apparatus calls the network information table.

At operation 1740 the display apparatus identifies whether the Wi-Fi MAC address registered to the network information table is present or not. When the registered Wi-Fi MAC address is not present, the display apparatus returns to the operation 1710.

When the registered Wi-Fi MAC address is present, at operation 1750 the display apparatus transmits an ARP request in a unicast mode with the IP address of the network information table.

At operation 1760 the display apparatus identifies whether an ARP response is received or not. That the ARP response is received may refer to the recently connected IP address of the mobile apparatus recorded in the network information table having not been changed. On the other hand, that the ARP response is not received may refer to the recently connected IP address of the mobile apparatus recorded in the network information table having been changed. When the ARP response is not received, the display apparatus enters a Discovery State or ARP Scan operation. The ARP scan operation will be described in greater detail below later.

When the ARP response is received, at operation 1770 the display apparatus identifies whether the corresponding Wi-Fi MAC address is present in the network information table. When the Wi-Fi MAC address is not present, the display apparatus returns to the operation 1710.

When the Wi-Fi MAC address is present, at operation 1780 the display apparatus authenticates the IP address, and identifies that the mobile apparatus is present in a local network to which the display apparatus belongs. The display apparatus enters a Detected State or ARP Keepalive operation. For convenience of description, the operations 1750 to 1780 will be called a Check IP operation.

The ARP Scan operation and the ARP Keepalive operation will be described in greater detail below.

Figure 18:
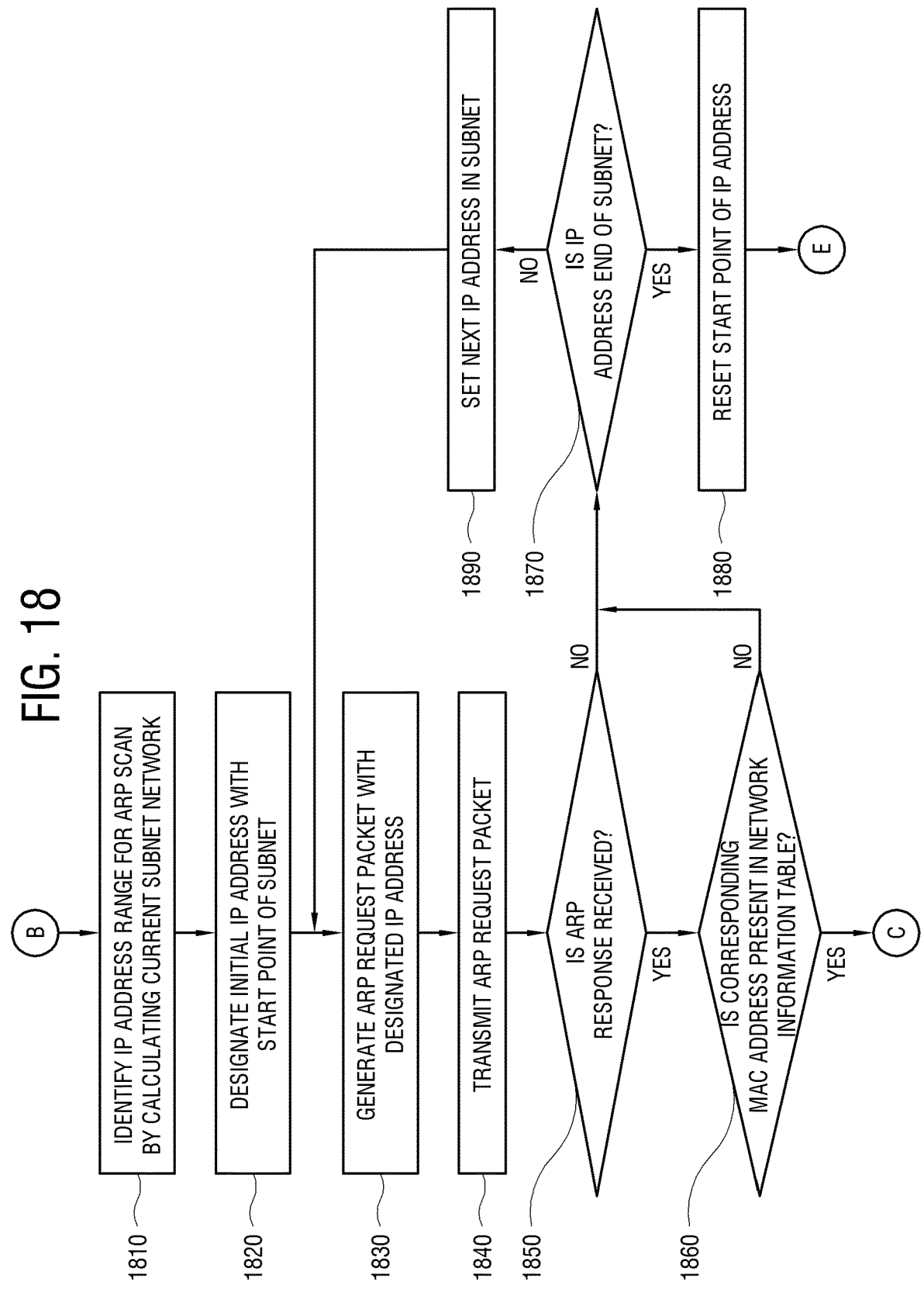
FIG. 18 is a flowchart illustrating an example address resolution protocol (ARP) Scan operation to be performed by a display apparatus according to an example embodiment of the disclosure.

FIG. 18 is a flowchart illustrating an example ARP Scan operation to be performed by a display apparatus according to an example embodiment of the disclosure.

As shown in FIG. 18, the following operations are performed by the processor of the display apparatus, in connection with the previous Check IP operation.

At operation 1810 the display apparatus identifies an IP address range for the ARP Scan by calculating a current subnet network, so that all the IP addresses connected to the local network can be scanned.

At operation 1820 the display apparatus designates an initial IP address with the start point of a subnet.

At operation 1830 the display apparatus generates an ARP request packet for updating and authenticating the IP address with the designated IP address.

At operation 1840 the display apparatus transmits an ARP request having the designated IP address.

At operation 1850 the display apparatus identifies whether the ARP response is received.

When the ARP response is received, at operation 1860 the display apparatus identifies whether the corresponding MAC address is present in the network information table.

When the corresponding MAC address is present in the table, the display apparatus enters the operation 1780 of the foregoing Check IP operation (see FIG. 17).

On the other hand, when it is identified in the operation 1850 that the ARP response is not received or when it is identified in the operation 1860 that the corresponding MAC address is not present, at operation 1870 the display apparatus identifies whether the IP address is an end of the subnet.

Figure 19:
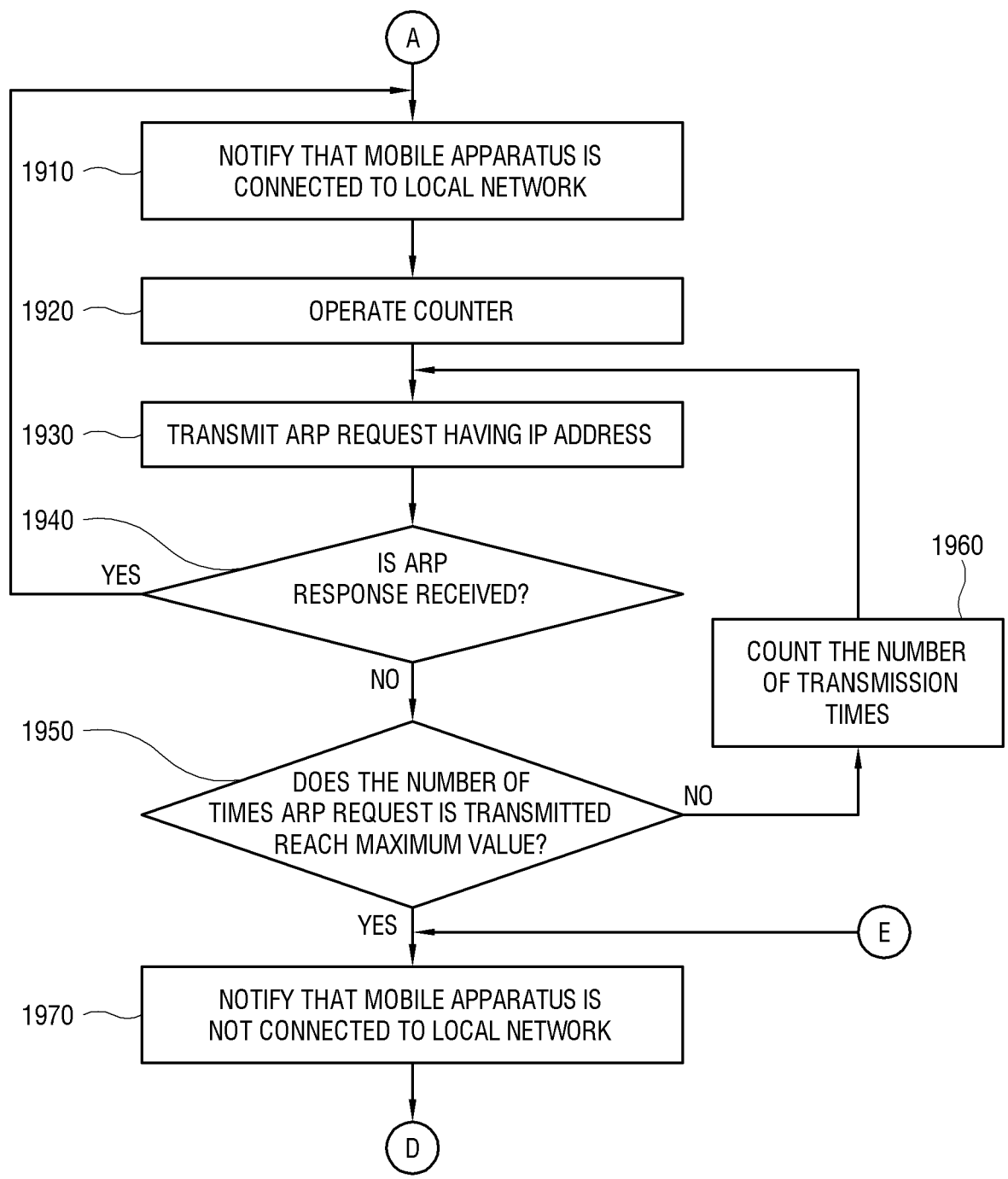
FIG. 19 is a flowchart illustrating an example ARP Keepalive operation to be performed by a display apparatus according to an example embodiment of the disclosure.

When the IP address is the end of the subnet, at operation 1880 the display apparatus resets a start point of the IP address and enters the operation 1970 of the ARP Keepalive operation (see FIG. 19). The operation 1970 of the ARP Keepalive operation will be described later.

On the other hand, when the IP address is not the end of the subnet, at operation 1890 the display apparatus sets the next IP address in the subnet and returns to the operation 1830.

Like this, when it is identified that the IP address is changed in the network information table, the display apparatus makes the IP addresses in the range of the subnet be sequentially subjected to the ARP check, thereby performing the ARP Scan operation to search for the changed IP address.

FIG. 19 is a flowchart illustrating an example ARP Keepalive operation to be performed by a display apparatus according to an example embodiment of the disclosure.

As shown in FIG. 19, the following operations are performed by the processor of the display apparatus, in connection with the previous Check IP operation.

At operation 1910 the display apparatus notifies that the mobile apparatus is connected to a local network. The display apparatus may display a message on its own display or transmit a message to another apparatus.

At operation 1920 the display apparatus operates a counter.

At operation 1930 the display apparatus transmits an ARP request having an IP address.

At operation 1940 the display apparatus identifies whether the ARP response is received. When the ARP response is received, the display apparatus returns to the operation 1910.

On the other hand, when the ARP response is not received, at operation 1950 the display apparatus identifies whether the number of times the ARP request is transmitted reaches a maximum value.

When the number of transmission times does not reach the maximum value, at operation 1960 the display apparatus counts the number of transmission times and returns to the operation 1930.

On the other hand, when the number of transmission times reaches the maximum value, at operation 1970 the display apparatus notifies that the mobile apparatus is not connected to the local network. The display apparatus returns to the operation 1710 (see FIG. 17) of the foregoing embodiment.

Like this, the display apparatus identifies whether the IP address corresponding to the registered Wi-Fi MAC address registered in the network information table in the Check IP operation is valid at a current point in time. The display apparatus enters the ARP Scan operation When the IP address is not valid, but enters the ARP Keepalive operation when the IP address is valid. The display apparatus reobtains the valid IP address in the ARP Scan operation, and enters the ARP Keepalive operation. In the ARP Keepalive operation, the display apparatus periodically performs the ARP check to identify whether the mobile apparatus is present in the local network.

Thus, the display apparatus periodically carries out the Wi-Fi presence check based on the IP address of the network information table, and identifies whether the mobile apparatus of which the Wi-Fi MAC address has been previously obtained is connected to the local network.

An ARP check method will be described in greater detail below.

Figure 20:
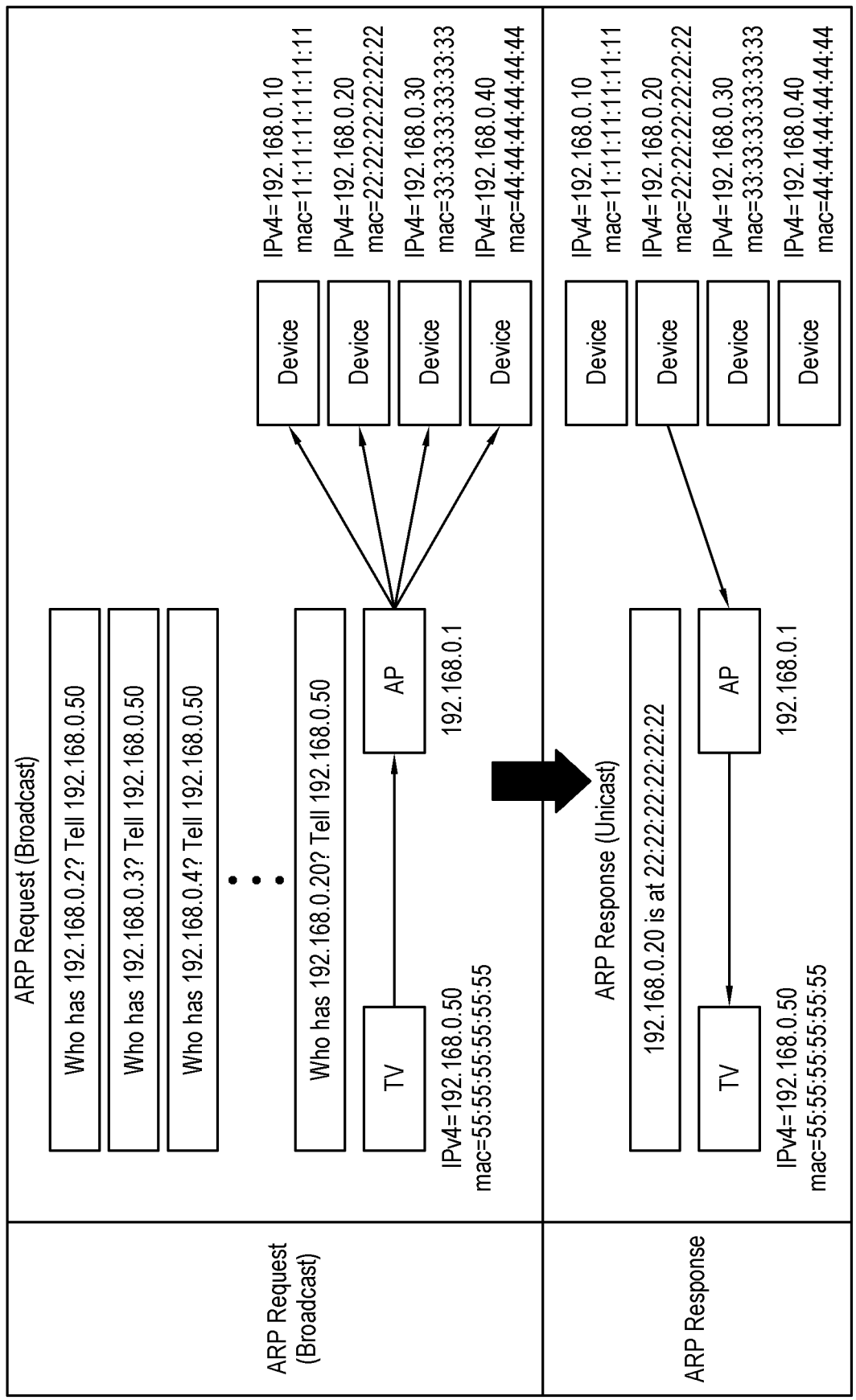
FIG. 20 is a diagram illustrating an example ARP checking principle in a broadcast mode according to an example embodiment of the disclosure.

FIG. 20 is a diagram illustrating an example ARP checking principle in a broadcast mode according to an example embodiment of the disclosure.

As shown in FIG. 20, according to a broadcast ARP check method, the display apparatus generates and broadcasts an ARP request packet to all external apparatuses connected to an AP. In this case, the ARP request packet is not transmitted as targeted at a certain specific external apparatus.

However, the ARP request packet includes an IP address of an external apparatus of which a Wi-Fi MAC address is desired to be obtained by the display apparatus. For example, when the external device of which the Wi-Fi MAC address is desired to be obtained by the display apparatus has an IP address of '192,168.0.20', the display apparatus generates an ARP request packet including the IP address of '192,168.0.20' and transmits the ARP request packet to the external apparatus.

All the external apparatuses connected to the AP to which the display apparatus is connected receive the ARP request packet in common broadcasted from the display apparatus. Each of the external apparatuses analyzes the received ARP request packet and identifies whether the IP address of '192,168.0.20' recorded in the ARP request packet is equal to its own IP address. The external apparatus ignores an ARP request when its own IP address is not equal to the IP address recorded in the ARP request packet.

On the other hand, when the external apparatus's own IP address is equal to the IP address recorded in the ARP request packet, the corresponding external apparatus generates an ARP response packet including its own Wi-Fi MAC address of '22:22:22:22:22:22'. Because the display apparatus has already been recognized in the external apparatus as the external apparatus receives the ARP request packet, the external apparatus transmits the ARP response packet targeted at the display apparatus in a unicast mode The display apparatus obtains the Wi-Fi MAC address of the external apparatus from the received ARP response packet. Thus, the display apparatus identifies that the external apparatus is present in the local network.

FIG. 21 is a diagram illustrating an example ARP checking principle in a unicast mode according to an example embodiment of the disclosure.

As shown in FIG. 21, the display apparatus periodically identifies whether the mobile apparatus is present in the local network according to a unicast ARP check method, after normally receiving the ARP response from the mobile apparatus. By the unicast ARP check method, the display apparatus generates the ARP request packet including the IP address of the mobile apparatus and transmits the ARP request packet targeted at the corresponding mobile apparatus. That is, unlike the broadcast method, the unicast method transmits the ARP request packet targeted at the apparatus corresponding to the IP address among all the apparatuses connected to the AP.

When the mobile apparatus receives the ARP request packet, the mobile apparatus generates the ARP response packet including the Wi-Fi MAC address and transmits it to the display apparatus.

The display apparatus obtains the Wi-Fi MAC address of the external apparatus from the received ARP response packet. Thus, the display apparatus identifies that the external apparatus is present in the local network.

FIG. 22 is a signal flow diagram illustrating an example in which a display apparatus periodically detects a mobile apparatus within a local network during an ARP Keepalive operation according to an example embodiment of the disclosure.

As shown in FIG. 22, a display apparatus 2210 includes an operation execution module 2211 for executing a preset operation, a BLE module 2212 for performing BLE communication, and a Wi-Fi module 2213 for performing Wi-Fi communication.

In response to a trigger event received from the BLE module 2212, the Wi-Fi module 2213 performs the ARP check. When the display apparatus 2210 and a mobile apparatus 2230 are connected to the same AP 2220, the mobile apparatus 2230 normally performs the ARP response with regard to the ARP request from the display apparatus 2210. The Wi-Fi module 2213 receives the ARP response and thus identifies that the mobile apparatus 2230 is present in the local network, and the operation execution module 2211 performs operation corresponding to the detected mobile apparatus 2230.

The Wi-Fi module 2213 stands by for a predetermined period of time after performing the ARP check, and then performs the next ARP check.

However, the mobile apparatus 2230 and the AP 2220 may be disconnected while the Wi-Fi module 2213 stands by. In this case, the mobile apparatus 2230 cannot receive the ARP request from the display apparatus 2210. Therefore, the Wi-Fi module 2213 cannot receive the ARP response corresponding to the ARP request in the next ARP check.

Thus, the Wi-Fi module 2213 identifies that the mobile apparatus 2230 is not present in the local network, and the operation execution module 2211 performs operation corresponding to a case where the mobile apparatus 2230 is not detected.

Meanwhile, in the description of the foregoing embodiments, the display apparatus cannot obtain the Wi-Fi MAC address of the mobile apparatus because the ARP check is not carried out when the AP to which the display apparatus is connected is different from the AP to which the mobile apparatus is connected. Further, in the description of the foregoing embodiments, the display apparatus periodically identifies whether the display apparatus and the mobile apparatus are connected to the same AP.

Alternatively, the display apparatus may send a message to the mobile apparatus so that the mobile apparatus can access a specific AP, thereby leading the mobile apparatus and the display apparatus to be connected to the same AP. Below, this will be described.

FIG. 23 is a signal flow diagram illustrating an example in which a display apparatus instructs a mobile apparatus to access an AP to which the display apparatus is connected according to an example embodiment of the disclosure.

As shown in FIG. 23, a system includes a display apparatus 2301, a mobile apparatus 2302, a first AP 2303, a second AP 2304, and a server 2305.

At operation 2310 the display apparatus 2301 is connected to the first AP 2303. Because the first AP 2303 is connected to the server 2305 through the WLAN, the display apparatus 2301 is also connected to the server 2305 through the first AP 2303.

At operation 2315 the mobile apparatus 2302 is connected to the second AP 2304. Here, the mobile apparatus 2302 may be connected to the server 2305 through the second AP 2304 or may be connected to the server 2305 through long term evolution (LTE) or the like additional mobile communication technology.

At operation 2320 the display apparatus 2301 is connected to the mobile apparatus 2302 through the BLE. The BLE-based connection between the display apparatus 2301 and the mobile apparatus 2302 refers to the mobile apparatus 2302 being located within an accessible area to the first AP 2303.

At operation 2325 the display apparatus 2301 transmits a request for Wi-Fi information to the mobile apparatus 2302 through the BLE communication.

At operation 2330 the mobile apparatus 2302 transmits the Wi-Fi information including the BSSID of the AP, to which the mobile apparatus 2302 is connected, to the display apparatus 2301 through the BLE communication.

At operation 2335 the display apparatus 2301 identifies that the mobile apparatus 2302 is not being connected to the first AP 2303, based on the Wi-Fi information.

At operation 2340 the display apparatus 2301 transmits a message, which instructs the mobile apparatus 2302 to access the first AP 2303, to the server 2305.

At operation 2345 the server 2305 authenticates the message based on a previously registered account. For example, the server 2305 authenticates that the message is valid when the display apparatus 2301 and the mobile apparatus 2302 are registered in the same user account or when a user account of the display apparatus 2301 and a user account of the mobile apparatus 2302 belong to a family or the like same category.

At operation 2350 the server 2305 transmits the authenticated message to the mobile apparatus 2302. The server 2305 may transmit the message through the second AP 2304 by a Wi-Fi method or by LTE or the like separate communication.

At operation 2355 the mobile apparatus 2302 is disconnected from the second AP 2304 and accesses the first AP 2303 based on the received message. When it is impossible to access the first AP 2303, the mobile apparatus 2302 transmits a message of an inaccessible state to the server 2305, and the server 2305 transmits the corresponding message again to the display apparatus 2301.

At operation 2360 the mobile apparatus 2302 transmits a message, which notifies of a successful access to the first AP 2303, to the server 2305, and the server 2305 transmits this message to the display apparatus 2301.

At operation 2365 the display apparatus 2301 obtains the Wi-Fi MAC address of the mobile apparatus 2302 through the ARP check, based on the message that notifies of the successful access to the first AP 2303. The method of obtaining the Wi-Fi MAC address has already been described in the foregoing embodiments, and therefore detailed descriptions thereof will not be repeated here.

Further, alternatively, the display apparatus may be connected to a predetermined first AP among a plurality of accessible APs through a second communication circuit, and the mobile apparatus may be connected to a predetermined second AP among the plurality of APs. When the display apparatus cannot obtain the Wi-Fi MAC address of the mobile apparatus, the display apparatus accesses the APs except the first AP among the plurality of accessible APs, thereby searching for the AP to which the mobile apparatus is connected.

For example, the display apparatus performs the ARP check after accessing a certain AP, and identifies whether an ARP response is received. When the ARP response is not received, the display apparatus accesses another AP, and then repeats the same process until the ARP response is received. The ARP check has already been described in the foregoing embodiments, and therefore detailed descriptions thereof will be avoided.

Meanwhile, in the description of the foregoing example embodiments, the display apparatus obtains the IP address from the mobile apparatus through the BLE communication. However, the method of obtaining the IP address in the display apparatus is not limited to an example embodiment, and various other methods are possible. Below, this will be described.

FIG. 24 is a signal flow diagram illustrating an example in which a display apparatus obtains a Wi-Fi MAC address through BLE communication according to an example embodiment of the disclosure.

As shown in FIG. 24, a system includes a display apparatus 2401, a mobile apparatus 2402, an AP 2403, and a server 2404.

At operation 2410 the display apparatus 2401 is connected to the AP 2403 for the Wi-Fi communication. The AP 2403 is connecting and communicating with the server 2404, and therefore the display apparatus 2401 can communicate with the server 2404 through the AP 2403.

At operation 2420 the mobile apparatus 2402 is connected to the AP 2403 for the Wi-Fi communication. However, in this operation, the display apparatus 2401 and the mobile apparatus 2402 do not know each other's Wi-Fi MAC address, and therefore the Wi-Fi communication is impossible between the display apparatus 2401 and the mobile apparatus 2402.

At operation 2430 the display apparatus 2401 obtains a BLE MAC address from the mobile apparatus 2402 and establishes BLE-based communication connection based on the obtained BLE MAC address. The BLE refers to a one-to-one communication method, and the display apparatus 2401 can obtain the BLE MAC address of the mobile apparatus 2402 through a BLE module while performing BLE-based pairing with the mobile apparatus 2402.

At operation 2440 the display apparatus 2401 transmits the obtained BLE MAC address of the mobile apparatus 2402 to the server 2404.

At operation 2450 the server 2404 searches for an IP address corresponding to the BLE MAC address received from the display apparatus 2401 and transmits the found IP address to the display apparatus 2401. The MAC address, the IP address and the like information of the apparatuses registered in units of account may be stored in the server 2404 as a database (DB), and thus the IP address recorded corresponding to the BLE MAC address of the mobile apparatus 2402 may be obtained from this DB. The apparatuses registered in the server 2404 notify the server 2404 of the IP addresses when the corresponding IP addresses are obtained or changed, thereby updating the DB of the server 2404.

At operation 2460 the display apparatus 2401 performs the broadcast-based ARP check through the Wi-Fi communication. Details of the ARP check are the same as described in the foregoing embodiments.

At operation 2470 the display apparatus 2401 detects an ARP response received from the mobile apparatus 2402.

At operation 2480 the display apparatus 2401 obtains the Wi-Fi MAC address of the mobile apparatus 2402 from the received ARP response. Thus, the display apparatus 2401 can perform the Wi-Fi communication with the mobile apparatus 2402 based on the Wi-Fi AMC address of the mobile apparatus 2402.

At operation 2490 the display apparatus 2401 updates "Detection Flag" with '1' in the network information table, thereby recording that the Wi-Fi MAC address of the corresponding mobile apparatus 2402 is obtained.

Like this, when the DB recorded with the BLE MAC address and the IP address of the mobile apparatus 2402 is provided in the server 2404, the display apparatus 2401 can obtain the IP address corresponding to the BLE MAC address of the mobile apparatus 2402 from the server 2404.

The operations of the apparatus described in the foregoing example embodiments may be performed by artificial intelligence provided in the corresponding apparatus. The artificial intelligence may be applied to various general systems by utilizing a machine learning algorithm. An artificial intelligence system may refer, for example, to a computer system with intelligence of a human or being second to a human. In such a system, a machine, an apparatus or a system autonomously performs leaning and identifying and is improved in accuracy of recognition and identification based on accumulated experiences. The artificial intelligence may be based on elementary technology by utilizing machine learning (deep-running) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program command recorded in this storage medium may be specially designed and configured according to the embodiments, or may be publicly known and available to those skilled in the art of computer software.

Although various example embodiments have been illustrated and described, it will be appreciated by those skilled in the art that various changes in form and detail may be made without departing from the principles and spirit of the disclosure, the scope of which includes the appended claims and their equivalents.

What is claimed is:

1. An electronic apparatus comprising:
a first communication circuit configured to perform wireless communication in a first mode;
a second communication circuit configured to perform wireless communication with an access point in a second mode; and
a processor configured to control the electronic apparatus to:
obtain first identification information for first mode-based wireless communication with an external apparatus through the first communication circuit,
control the first communication circuit to establish the first mode-based wireless communication with the external apparatus,
obtain an IP address of the external apparatus for second mode-based wireless communication with the external apparatus through the first communication circuit,
based on the obtained IP address of the external apparatus, send a request for identification information of the external apparatus through the second communication circuit, the identification information of the external apparatus being for the second mode-based wireless communication with the external apparatus,
obtain the identification information of the external apparatus for the second mode-based wireless communication,
based on the obtained identification information of the external apparatus, identify whether a second mode-based wireless communication connection with the external apparatus is established through the second communication circuit,
perform a first operation corresponding to presence of the external apparatus based on the second mode-based wireless communication connection with the external apparatus being established, and
perform a second operation corresponding to absence of the external apparatus based on the second mode-based wireless communication connection with the external apparatus being not established.

2. The electronic apparatus according to claim 1, wherein the first mode-based wireless communication comprises Bluetooth communication complying with Institute of Electrical and Electronic Engineers (IEEE) 802.15 standards, and the second mode-based wireless communication comprises a wireless local area network (WLAN) communication complying with IEEE 802.11 standards.

3. The electronic apparatus according to claim 2, wherein the first identification information for the first mode-based wireless communication comprises medium access control (MAC) address information for Bluetooth communication, and the identification information of the external apparatus comprises MAC address information for WLAN communication.

4. The electronic apparatus according to claim 1, wherein the processor is configured to control the electronic apparatus to:
transmit, via the second communication circuit, in a broadcast mode, the request for identification information of the external apparatus to a plurality of external electronic apparatuses connected to the access point, and
control the second communication circuit to receive a response comprising the identification information of the external apparatus from the external apparatus corresponding to the IP address among the plurality of external apparatuses.

5. The electronic apparatus according to claim 4, wherein the processor is configured to control the electronic apparatus to:
- store a record that no response comprising the identification information of the external apparatus is received, based on receiving no response to the request for the identification information of the external apparatus, and
- periodically re-transmit, via the second communication circuit, the request for the identification information of the external apparatus, based on the stored record.

6. The electronic apparatus according to claim 4, wherein the processor is configured to control the electronic apparatus to:
- transmit, via the second communication circuit, in a unicast mode, a request for the identification information of the external apparatus to the external apparatus, and
- identify that the external apparatus is within a specified proximity of the electronic apparatus based on a response to the request transmitted in the unicast mode received from the external apparatus.

7. The electronic apparatus according to claim 1, wherein the processor is configured to control the electronic apparatus to:
- obtain identification information of an access point to which the external apparatus is connected from the external apparatus through the first communication circuit, and
- based on the identification information of the access point, identify whether the access point to which the external apparatus is connected is the same as the access point with which the second communication circuit communicates, and
- based on identifying that the access point to which the external apparatus is connected is the same as the access point with which the second communication circuit communicates, send the request for the identification information of the external apparatus through the second communication circuit.

8. The electronic apparatus according to claim 1, wherein the processor is configured to control the electronic device to: identify whether the IP address has been changed, and based on identifying that the IP address has changed, obtain a changed IP address by scanning the IP addresses within an address range of a subnet network.

9. The electronic apparatus according to claim 1, wherein the first operation comprises displaying
- an image and the second operation comprises stopping displaying an image.

10. The electronic apparatus according to claim 1, wherein the first mode-based wireless communication comprises one-to-one communication without the access point, and wherein the first mode-based wireless communication has a shorter communication range than the second mode-based wireless communication.

11. The electronic apparatus according to claim 1, wherein the processor is configured to control the electronic apparatus to establish a communication connection using the second communication circuit based on disconnection of a communication connection using the first communication circuit.

12. The electronic apparatus according to claim 1, wherein the processor is configured to control the electronic apparatus to:
- transmit, to the external apparatus, via the first communication circuit, a guide message for accessing the access point, based on not obtaining the identification information of the external apparatus.

13. The electronic apparatus according to claim 1, wherein the processor is configured to, based on not obtaining via the second communication circuit the identification information of the external apparatus while being connected to a certain access point among a plurality of access points, control the electronic apparatus to obtain the identification information of the external apparatus by accessing another access point among the plurality of access points.

14. The electronic apparatus according to claim 1, wherein the processor is configured to control the electronic apparatus to:
- transmit the first identification information to a server through the second communication circuit, and
- receive the IP address corresponding to the first identification information from the server through the second communication circuit.

15. A method of controlling an electronic apparatus, comprising:
- obtaining first identification information for first mode-based wireless communication with an external apparatus through a first communication circuit configured to perform wireless communication in a first mode;
- controlling the first communication circuit to establish the first mode-based wireless communication with the external apparatus;
- obtaining an IP address of the external apparatus for second mode-based wireless communication with the external apparatus through the first communication circuit;
- based on the obtained IP address of the external apparatus, send a request for identification information of the external apparatus through the second communication circuit, the identification information of the external apparatus being for the second mode-based wireless communication with the external apparatus through a second communication circuit configured to perform wireless communication with an access point in a second mode;
- obtaining the identification information of the external apparatus for the second mode-based wireless communication;
- based on the obtained identification information of the external apparatus, identifying whether a second mode-based wireless communication connection with the external apparatus is established through the second communication circuit;
- performing a first operation corresponding to presence of the external apparatus based on the second mode-based wireless communication connection with the external apparatus being established; and
- performing a second operation corresponding to absence of the external apparatus based on the second mode-based wireless communication connection with the external apparatus being not established.

16. The method according to claim 15, wherein the first mode-based wireless communication comprises Bluetooth communication complying with Institute of Electrical and Electronic Engineers (IEEE) 802.15 standards, and the second mode-based wireless communication comprises a wireless local area network (WLAN) communication complying with IEEE 802.11 standards.

17. A non-transitory computer-readable medium comprising instructions, which when executed by a processor of an electronic device, configure the processor to control the electronic device to perform operations comprising:

obtaining first identification information for first mode-based wireless communication with an external apparatus through a first communication circuit configured to perform wireless communication in a first mode;

controlling the first communication circuit to establish the first mode-based wireless communication with the external apparatus;

obtaining an IP address of the external apparatus for second mode-based wireless communication with the external apparatus through the first communication circuit;

based on the obtained IP address of the external apparatus, send a request for identification information of the external apparatus through the second communication circuit, the identification information of the external apparatus being for the second mode-based wireless communication with the external apparatus through a second communication circuit configured to perform wireless communication with an access point in a second mode;

obtaining the identification information of the external apparatus for the second mode-based wireless communication;

based on the obtained identification information of the external apparatus, identifying whether a second mode-based wireless communication connection with the external apparatus is established through the second communication circuit;

performing a first operation corresponding to presence of the external apparatus based on the second mode-based wireless communication connection with the external apparatus being established; and performing a second operation corresponding to absence of the external apparatus based on the second mode-based wireless communication connection with the external apparatus being not established.

\* \* \* \* \*